(12) United States Patent
Neissl et al.

(10) Patent No.: US 9,512,246 B2
(45) Date of Patent: Dec. 6, 2016

(54) PROCESS FOR THE PREPARATION OF POLYPROPYLENE WITH IMPROVED PRODUCTIVITY

(71) Applicant: Borealis AG, Vienna (AT)

(72) Inventors: Wolfgang Neissl, Lichtenberg (AT); Dietrich Gloger, Linz (AT); Thomas Horill, Gerasdorf (AT); Martina Sandholzer, Linz (AT); Gregory Potter, Linz (AT)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 14/418,808

(22) PCT Filed: Jul. 30, 2013

(86) PCT No.: PCT/EP2013/065945
§ 371 (c)(1),
(2) Date: Jan. 30, 2015

(87) PCT Pub. No.: WO2014/023604
PCT Pub. Date: Feb. 13, 2014

(65) Prior Publication Data
US 2015/0191556 A1   Jul. 9, 2015

(30) Foreign Application Priority Data

Aug. 7, 2012   (EP) .................................... 12179546

(51) Int. Cl.
| C08F 10/06 | (2006.01) |
| C08F 210/06 | (2006.01) |
| C08F 2/00 | (2006.01) |
| C08F 4/654 | (2006.01) |
| C08F 2/14 | (2006.01) |

(52) U.S. Cl.
CPC ............... C08F 10/06 (2013.01); C08F 2/001 (2013.01); C08F 210/06 (2013.01)

(58) Field of Classification Search
CPC .... C08F 2/001; C08F 4/6543; C08F 210/06; C08F 2500/12; C08F 2500/15
USPC .............................. 526/65, 348, 904; 525/53
See application file for complete search history.

(56) References Cited

U.S. PATENT DOCUMENTS

| 5,234,879 A * | 8/1993 | Garoff | ..................... | C08F 10/00 502/104 |
| 8,017,704 B2 * | 9/2011 | Leskinen | ............. | C08F 210/06 526/90 |
| 2009/0312507 A1 * | 12/2009 | Standaert | ................ | C08F 10/00 526/125.8 |

FOREIGN PATENT DOCUMENTS

| EP | 0 409 492 A1 | 1/1991 |
| EP | 0 491 566 A2 | 6/1992 |
| EP | 0 586 390 A1 | 3/1994 |
| EP | 0 591 224 A1 | 4/1994 |
| EP | 0 887 379 A1 | 12/1998 |
| EP | 0 887 380 A1 | 12/1998 |
| EP | 0 887 381 A1 | 12/1998 |
| EP | 0 991 684 A1 | 4/2000 |
| JP | S63-291907 A | 11/1988 |
| JP | H7-252318 A | 10/1995 |
| JP | H7-309912 A | 11/1995 |
| JP | 2007-119747 A | 5/2007 |
| JP | 2007119747 A | 5/2007 |
| JP | 2009-57473 A | 3/2009 |
| JP | 2009-534513 A | 9/2009 |
| JP | 2010-513670 A | 4/2010 |
| KR | 2001-0015803 A | 2/2001 |
| WO | 87/07620 A1 | 12/1987 |
| WO | 92/12182 A1 | 7/1992 |
| WO | 92/19653 A1 | 11/1992 |
| WO | 92/19658 A1 | 11/1992 |
| WO | 99/24478 A1 | 5/1999 |
| WO | 99/24479 A1 | 5/1999 |
| WO | 00/68315 A1 | 11/2000 |
| WO | 04/000899 A1 | 12/2003 |
| WO | 2004/111095 A1 | 12/2004 |

OTHER PUBLICATIONS

Online translation of JP 2007-119747 A; publication date: May 2007.*
Polypropylene Homopolymer Data Sheet, Plastics International, one page (Undated).*
Busico, V. & Cipullo, R., "Microstructure of Polypropylene," Prog. Polym. Sci. 26 (2001) 443-533.
Busico, V., Cipullo, R., Monaco, G. & Vacatello, M., "Full Assignment of the $^{13}C$ NMR Spectra of Regioregular Polypropylenes: Methyl and Methylene Region," Macromolecules 30 (1997) 6251-6263.
Busico, V., Carbonniere, P., Cipullo, R. Pellecchia, R., Severn, J. & Talarico, G., "Alk-1-ene Polymerization in the Presence of a Monocyclopentadienyl Zirconium (IV) Acetamidinate Catalyst: Microstructural and Mechanistic Insights," Macromol. Rapid Commun. 28 (2007) 1128-1134.
Cheng, H. N., "$^{13}C$ NMR Analysis of Ethylene-Propylene Rubbers," Macromolecules 17 (1984) 1950-1955.

(Continued)

Primary Examiner — Fred M Teskin
(74) Attorney, Agent, or Firm — Warn Partners, P.C.

(57) ABSTRACT

A process for the preparation of a polypropylene in a sequential polymerization process including a pre-polymerization reactor and at least two polymerization reactors connected in series. The polymerization in the at least two polymerization reactors takes place in the presence of a Ziegler-Natta catalyst. The Ziegler-Natta catalyst includes (a) a pro-catalyst that has a compound of a transition metal, a compound of a metal which metal is selected from one of the groups 1 to 3 of the periodic table (IUPAC), and an internal electron donor, (b) a co-catalyst, and (c) an external donor. The Ziegler-Natta catalyst is present in the pre-polymerization reactor. Ethylene and propylene are fed to the pre-polymerization reactor in a feed rate ratio of 0.5 to 10.0 g/kg.

21 Claims, No Drawings

(56) References Cited

OTHER PUBLICATIONS

Heino, E-L., Lehtineni, A., Tanner, J. & Seppala, J., "Rheological Characterization of Polyethylene Fractions," Theoretical and Applied Rheology (1992) 360-362.

Heino, E-L., "The Influence of Molecular Structure on Some Rheological Properties of Polyethylene," Annual Transactions of the Nordic Rheology Society 3 (1995) 71-73.

Kakugo, M., Naito, Y., Mizunuma, K. & Miyatake, T., "$^{13}$C NMR Determination of Monomer Sequence Distribution in Ethylene-Propylene Copolymers Prepared with δ-TiCl$_3$-Al(C$_2$H$_5$)$_2$Cl ," Macromolecules 15 (1982) 1150-1152.

Randall, J., "A Review of High Resolution Liquid $^{13}$carbon Nuclear Magnetic Resonance Characterizations of Ethylene-Based Polymers," Rev. Macromol. Chem. Phys. C29 (2 & 3) (1989) 201-317.

Resconi, L., Cavallo, L., Fait, A. & Piemontesi, F., "Selectivity in Propene Polymerization with Metallocene Catalysts," Chem. Rev. 100 (2000) 1253-1345.

Singh, G., Kothari, A. & Gupta, V., "Triad Sequence Determination of Ethylene-Propylene Copolymers—Application of Quantitative $^{13}$C NMR," Polymer Testing 28 (2009) 475-479.

Wang, W-J. & Zhu, S., "Structural Analysis of Ethylene/Propylene Copolymers Synthesized with a Constrained Geometry Catalyst," Macromolecules 33 (2000) 1157-1162.

Zhou, Z., Kummerle, R., Qiu, X., Redwine, D., Cong, R., Taha, A., Baugh, D. & Winninford, B., "A New Decoupling Method for Accurate Quantification of Polyethylene Copolymer Composition and Triad Sequence Distribution with $^{13}$C NMR," Journal of Magnetic Resonance 187 (2007) 225-233.

International Search Report for International Application No. PCT/EP2013/065945, Mailed Sep. 13, 2013.

\* cited by examiner

PROCESS FOR THE PREPARATION OF POLYPROPYLENE WITH IMPROVED PRODUCTIVITY

CROSS REFERENCE TO RELATED APPLICATIONS

This application is a National Stage of International Application No. PCT/EP2013/065945, filed Jul. 30, 2013. This application claims priority to European Patent Application No. 12179546.2 filed on Aug. 7, 2012. The disclosure of the above applications are incorporated herein by reference.

The present invention is directed to a new process with increased productivity for the manufacture of polypropylene having a low ash content.

Polypropylene is used in many applications and is for instance the material of choice in the field of film capacitors as its chain lacks any kind of polar groups which orient under electrical field stress. As a result, polypropylene intrinsically possesses a low loss factor and high volume resistivity. These properties, combined with a relatively high dielectric constant and self-healing character in the capacitor as well as good mechanical properties, like high melting temperature and high stiffness, make polypropylene so valuable in this technical field. However in case a Ziegler-Natta catalyst has been employed during the manufacture of the polypropylene, typically the dielectric film made from such a polypropylene contains considerable amounts of polar residues, like chlorine, aluminium, titanium, magnesium or silicon originating from the used Ziegler-Natta catalyst. These residues decrease the resistivity, i.e. increase the conductivity of the polymers, making the polymer unsuitable to be used as such in applications, where very low conductivity is needed, like in films for capacitors. Accordingly to make polypropylene commercially attractive in this technical field it must be difficulty purified, typically washed in order to remove the undesired residues from the polymer material, a process which is time consuming and cost-intensive. Typically the purification of the polymer is carried out in an additional step after the last polymerisation step. Accordingly the polymer from the last polymerization step is conducted into a washing step, where the catalyst residues are dissolved out of the polymer material. Washing liquid typically used comprises organic hydrocarbon solvents having polar groups, like hydroxyl groups, e.g. propanol.

The high amount of residues is caused by several factors, wherein productivity plays a central role. In case the productivity of the used catalyst is high during the polymerization process, lower amounts of catalyst can be employed and thus the amount of undesired residues can be reduced.

Accordingly the object of the present invention is to provide a process which enables a skilled person to produce a polypropylene with high productivity by keeping the residue content in the polypropylene low even without the need to apply a troublesome washing step.

The finding of the present invention is to use an ethylene feed during a pre-polymerization step in order to surprisingly increase catalyst productivity. Further in the process of the present invention, a Ziegler Natta catalyst with a very balanced mol-ratio of co-catalyst (Co) to external donor (ED) [Co/ED] and/or of co-catalyst (Co) to transition metal (TM) [Co/TM] is preferably used.

Accordingly, the present invention relates to a process for the preparation of a polypropylene (PP) in a sequential polymerization process comprising a pre-polymerization reactor (PR) and at least two polymerization reactors (R1 and R2) connected in series, wherein the polymerization in the at least two polymerization reactors (R1 and R2) takes place in the presence of a Ziegler-Natta catalyst (ZN-C), and said Ziegler-Natta catalyst (ZN-C) comprises
(a) a pro-catalyst (PC) comprising
 (a1) a compound of a transition metal (TM),
 (a2) a compound of a metal (M) which metal is selected from one of the groups 1 to 3 of the periodic table (IUPAC),
 (a3) an internal electron donor (ID),
(b) a co-catalyst (Co), and
(c) an external donor (ED),
 wherein
 said Ziegler-Natta catalyst (ZN-C) is present in the pre-polymerization reactor (PR) and ethylene (C2) in addition to propylene (C3) is fed to said pre-polymerization reactor (PR)
(ii) in a C2/C3 feed ratio of 0.5 to 10.0 g/kg;
and/or
(iii) in a manner to accomplish a C2/C3 ratio in the pre-polymerization reactor (PR) of 0.5 to 5.0 mol/kmol.

Preferably the mol-ratio of co-catalyst (Co) to external donor (ED) [Co/ED] is in the range of above 10 to below 25 and/or the mol-ratio of co-catalyst (Co) to transition metal (TM) [Co/TM] is in the range of above 100 to below 200, The process according to the present invention preferably includes a sequential polymerization process comprising in addition to pre-polymerization in the pre-polymerization reactor (PR) at least two, preferably at least three polymerization reactors (R1, R2 and R3) connected in series. In a further preferred embodiment, the temperature is at least in one of the at least two polymerization reactors, preferably at least in one of the at least three polymerization reactors (R1, R2 and R3), preferably in all three reactors (R1, R2 and R3), in the range of 50° C. to 130° C. Additionally or alternatively, it is preferred that pre-polymerization is carried out in the pre-polymerization reactor (PR) at a temperature of 0 to 60° C.

It has been surprisingly found out that a polypropylene (PP) produced according to the inventive process using an ethylene feed during pre-polymerization and using a specific Ziegler-Natta catalyst (ZN-C) has a low residue content. Further the productivity of the applied catalyst under these conditions is very high.

With the instant process it is possible to produce a specific polypropylene (PP). Accordingly the present invention is also directed to an ethylene-propylene copolymer (E-PP) having
(a) a melt flow rate ($MFR_2$) measured according to ISO 1133 in the range of 0.5 to 7.0 g/10 min,
(b) a melting temperature $T_m$ of more than 163° C.,
(c) an ethylene content of more than 0.20 wt.-% to 0.80 wt.-% based on the total weight of the ethylene-propylene copolymer (E-PP), and
(d) a crystalline fraction melting above 170 to 180° C. of at least 14.0 wt.-%, wherein said fraction is determined by the stepwise isothermal segregation technique (SIST),
 wherein optionally said ethylene-propylene copolymer (E-PP) has further
(e) a crystallization temperature $T_c$ of more than 110° C., and/or
(f) 2,1 erythro regio-defects of equal or below 0.4 mol determined by $^{13}$C-NMR spectroscopy,
and/or (g) a crystalline fraction melting above 160 to 170° C. of more than 36.0 wt.-%, wherein said fraction is determined by the stepwise isothermal segregation technique (SIST),
and/or
(h) an ash content below 45 ppm,
and/or
(i) a shear thinning index (0/100) measured according to ISO 6271-10 (200° C.) of at least 20,
and/or
(j) a polydispersity index (PI) of at least 2.5.

In the following the invention will be described in more detail.

Polymerization Process:

The process according the present invention comprises a pre-polymerization step in a pre-polymerization reactor (PR). Subsequent thereto, the (main) polymerization in the at least two reactors (R1 and R2) takes place. Accordingly all reactors, i.e. the pre-polymerization reactor (PR) and the other reactors arranged downstream to the pre-polymerization reactor (PR), i.e. the at least two reactors (R1 and R2), are connected in series.

The term "pre-polymerization" as well as the term "pre-polymerization reactor (PR)" indicates that this is not the main polymerization in which the instant polypropylene (PP) is produced. In turn in the "at least two reactors (R1 and R2)" takes the main polymerization place, i.e. the polypropylene (PP) of the instant invention is produced. Accordingly in the pre-polymerization reactor (PR), i.e. in the pre-polymerization step, propylene in the presence of low amounts of ethylene is polymerized to the polypropylene (Pre-PP). Typically the weight ratio of the polypropylene (Pre-PP) produced in pre-polymerization reactor (PR) and the transition metal (TM) of the Ziegler-Natta catalyst (ZN-C) is below 4.0 kg Pre-PP/g TM, more preferably in the range of 0.5 to 4.0, still more preferably in the range of 0.8 to 3.0, yet more preferably in the range of 1.0 to 2.5 kg Pre-PP/g TM.

Further the weight average molecular weight ($M_w$) of the polypropylene (Pre-PP) produced in the pre-polymerization reactor (PR) is rather low. Thus it is preferred that the polypropylene (Pre-PP) produced in the pre-polymerization reactor (PR) has weight average molecular weight ($M_w$) of below or equal 300,000 g/mol, more preferably below 200,000 g/mol. In preferred embodiments the weight average molecular weight ($M_w$) of the polypropylene (Pre-PP) produced in the pre-polymerization reactor (PR) is in the range of 5,000 to 200,000 g/mol, more preferably in the range of 5,000 to 100,000 g/mol, even more preferably in the range of 5,000 to 50,000 g/mol.

One essential aspect of the instant invention is that a specific ratio of propylene (C3) and ethylene (C2) feed into the pre-polymerization reactor (PR) must be used. Accordingly the ethylene is fed to the pre-polymerization reactor (PR) in addition to propylene in a C2/C3 feed ratio of 0.5 to 10.0 g/kg, preferably of 1.0 to 8.0 g/kg, more preferably of 1.5 to 7.0 g/kg, still more preferably of 2.0 to 6.0 g/kg. Preferably this feed ratio is used to accomplish a preferred C2/C3 ratio in the pre-polymerization reactor (PR). It is preferred that the C2/C3 ratio in the pre-polymerization reactor (PR) is of 0.5 to 5.0 mol/kmol, preferably of 0.8 to 3.0 mol/kmol, more preferably of 1.0 to 2.0 mol/kmol, still more preferably of 1.1 to 1.8 mol/kmol.

The pre-polymerization reaction is typically conducted at a temperature of 0 to 60° C., preferably from 15 to 50° C., and more preferably from 20 to 45° C.

The pressure in the pre-polymerization reactor is not critical but must be sufficiently high to maintain the reaction mixture in liquid phase. Thus, the pressure may be from 20 to 100 bar, for example 30 to 70 bar.

In a preferred embodiment, the pre-polymerization is conducted as bulk slurry polymerization in liquid propylene, i.e. the liquid phase mainly comprises propylene, with optionally inert components dissolved therein. Furthermore, according to the present invention, an ethylene feed is employed during pre-polymerization as mentioned above.

As mentioned above the pre-polymerization is conducted in the presence of the Ziegler-Natta catalyst (ZN-C). Accordingly all the components of the Ziegler-Natta catalyst (ZN-C), i.e. the pro-catalyst (PC), the co-catalyst (Co), and the external donor (ED), are all introduced to the pre-polymerization step. However, this shall not exclude the option that at a later stage for instance further co-catalyst (Co) is added in the polymerization process, for instance in the first reactor (R1). In a preferred embodiment the pro-catalyst (PC), the co-catalyst (Co), and the external donor (ED) are only added in the pre-polymerization reactor (PR).

It is possible to add other components also to the pre-polymerization stage. Thus, hydrogen may be added into the pre-polymerization stage to control the molecular weight of the polypropylene (Pre-PP) as is known in the art. Further, antistatic additive may be used to prevent the particles from adhering to each other or to the walls of the reactor.

The precise control of the pre-polymerization conditions and reaction parameters is within the skill of the art.

Due to the above defined process conditions a mixture (MI) of the Ziegler-Natta catalyst (ZN-C) and the polypropylene (Pre-PP) produced in the pre-polymerization reactor (PR) is obtained. Preferably the Ziegler-Natta catalyst (ZN-C) is (finely) dispersed in the polypropylene (Pre-PP). In other words the Ziegler-Natta catalyst (ZN-C) particles introduced in the pre-polymerization reactor (PR) split into smaller fragments which are evenly distributed within the growing polypropylene (Pre-PP). The sizes of the introduced Ziegler-Natta catalyst (ZN-C) particles as well as of the obtained fragments are not of essential relevance for the instant invention and within the skilled knowledge.

Subsequent to the pre-polymerization, the mixture (MI) of the Ziegler-Natta catalyst (ZN-C) and the polypropylene (Pre-PP) produced in the pre-polymerization reactor (PR) is transferred to the first reactor (R1). Typically the total amount of the polypropylene (Pre-PP) in the final polypropylene (PP) is rather low and typically not more than 5.0 wt.-%, more preferably not more than 4.0 wt.-%, still more preferably in the range of 0.5 to 4.0 wt.-%, like in the range 1.0 of to 3.0 wt.-%.

One further requirement of the present invention is that the process for the (main) preparation of polypropylene (PP) comprises a sequential polymerization process comprising at least two polymerization reactors (R1 and R2). In a preferred embodiment, the sequential polymerization process comprises at least three polymerization reactors (R1, R2 and R3).

The term "sequential polymerization process" indicates that the polypropylene is produced in at least two, preferably three polymerization reactors connected in series. Accordingly the present process preferably comprises at least a first polymerization reactor (R1), a second polymerization reactor (R2), and a third polymerization reactor (R3). The term "polymerization reactor" shall indicate that the main polymerization takes place. That means the expression "polymerization reactor" does not include the pre-polymerization reactor employed according to the present invention. Thus, in case the process "consists of" three polymerization reactors, this definition does by no means exclude that the overall process comprises the pre-polymerization step in a pre-polymerization reactor. The term "consist of" is only a closing formulation in view of the main polymerization reactors.

Accordingly, in the at least two reactors (R1 and R2), preferably in the at least three reactors (R1, R2, and R3), more preferably in the three reactors (R1, R2, and R3), the polypropylene (PP) is produced. Thus the polypropylene (PP) according to this invention preferably comprises at least two fractions (PP-A and PP-B), more preferably consists of two fractions (PP-A and PP-B), still more preferably comprises at least three fractions (PP-A, PP-B and PP-C), yet more preferably consists of three fractions (PP-A, PP-B and PP-C). Preferably these fractions differ in at least one property, preferably in the molecular weight and thus in the melt flow rate and/or in the comonomer content (see below).

In addition to the fractions defined in the previous paragraph the polypropylene (PP) comprises also low amounts of the polypropylene (Pre-PP) as defined above.

The first reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention the slurry reactor (SR) is preferably a (bulk) loop reactor (LR).

Preferably the polypropylene (PP), i.e. the first polypropylene fraction (PP-A) of the polypropylene (PP), of the first reactor (R1), more preferably polymer slurry of the loop reactor (LR) containing the first polypropylene fraction (PP-A) of the polypropylene (PP), is directly fed into the second reactor (R2), e.g. into a first gas phase reactor (GPR-1), without a flash step between the stages. This kind of direct feed is described in EP 887379 A, EP 887380 A, EP 887381 A and EP 991684 A. By "direct feed" is meant a process wherein the content of the first reactor (R1), i.e. of the loop reactor (LR), the polymer slurry comprising the first polypropylene fraction (PP-A) of the polypropylene (PP), is led directly to the next stage gas phase reactor.

Alternatively, the polypropylene (PP), i.e. the first polypropylene fraction (PP-A) of the polypropylene (PP), of the first reactor (R1), more preferably polymer slurry of the loop reactor (LR) containing the first polypropylene fraction (PP-A) of the polypropylene (PP), may be also directed into a flash step or through a further concentration step before fed into the second reactor (R2), e.g. into the first gas phase reactor (GPR-1). Accordingly, this "indirect feed" refers to a process wherein the content of the first reactor (R1), of the loop reactor (LR), i.e. the polymer slurry, is fed into the second reactor (R2), e.g. into the first gas phase reactor (GPR-1), via a reaction medium separation unit and the reaction medium as a gas from the separation unit.

A gas phase reactor (GPR) according to this invention is preferably a fluidized bed reactor, a fast fluidized bed reactor or a settled bed reactor or any combination thereof.

More specifically, the second reactor (R2), the third reactor (R3) and any subsequent reactor, if present, are preferably gas phase reactors (GPRs). Such gas phase reactors (GPR) can be any mechanically mixed or fluid bed reactors. Preferably the gas phase reactors (GPRs) comprise a mechanically agitated fluid bed reactor with gas velocities of at least 0.2 m/sec. Thus it is appreciated that the gas phase reactor is a fluidized bed type reactor preferably with a mechanical stirrer.

Thus in a preferred embodiment the first reactor (R1) is a slurry reactor (SR), like loop reactor (LR), whereas the second reactor (R2), the third reactor (R3) and any optional subsequent reactor are gas phase reactors (GPR). Accordingly for the instant process at least three, preferably three polymerization reactors, namely a slurry reactor (SR), like a loop reactor (LR), a first gas phase reactor (GPR-1), and a second gas phase reactor (GPR-2) connected in series are used. Prior to the slurry reactor (SR) a pre-polymerization reactor is placed according to the present invention.

As mentioned above, the Ziegler-Natta catalyst (ZN-C), is fed into the pre-polymerization reactor (PR) and is subsequently transferred with the polypropylene (Pre-PP) obtained in pre-polymerization reactor (PR) into the first reactor (R1).

Preferably the Ziegler-Natta catalyst (ZN-C) is transferred as a slurry to the first reactor (R1), like loop reactor (LR). Preferably the slurry contain apart from the Ziegler-Natta catalyst (ZN-C) and the polypropylene (Pre-PP) also to some content un-reacted propylene and ethylene. Accordingly also the first reactor (R1), like the loop reactor (LR), may contain some ethylene originally fed to the pre-polymerization reactor (PR). Accordingly it is preferred that the C2/C3 ratio in the first reactor (R1), like loop reactor (LR) is of 0.05 to 1.50 mol/kmol, preferably of 0.08 to 1.00 mol/kmol, more preferably of 0.10 to 0.80 mol/kmol, still more preferably of 0.15 to 0.50 mol/kmol. This specific ratio is accomplished preferably without additional ethylene feed in the first reactor (R1), like loop reactor (LR). In any reactor subsequent to the first reactor (R1), like loop reactor (LP), no ethylene from the pre-polymerization reactor is present.

A preferred multistage process is a "loop-gas phase"- process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Especially good results are achieved in case the temperature in the reactors is carefully chosen. Accordingly it is preferred that the temperature in at least one of the three reactors, preferably at least in the first reactor (R1), i.e. in the loop reactor (LR), is in the range of 50 to 130° C., more preferably in the range of 70 to 100° C., still more preferably in the range of 70 to 90° C., yet more preferably in the range of 80 to 90° C., like in the range of 82 to 90° C., i.e. 85° C. In one preferred embodiment, the process comprises three polymerization reactors and in all three reactors the temperature is in the range of 50 to 130° C., more preferably in the range of 70 to 100° C., still more preferably in the range of 70 to 90° C., yet more preferably in the range of 80 to 90° C., like in the range of 82 to 90° C., i.e. 85° C. or 90° C.

Typically the pressure in the first reactor (R1), preferably in the loop reactor (LR), is in the range of from 20 to 80 bar, preferably 30 to 60 bar, whereas the pressure in the second reactor (R2), i.e. in the first gas phase reactor (GPR-1), and in the third reactor (R3), i.e. in the second gas phase reactor (GPR-2), and in any subsequent reactor, if present, is in the range of from 5 to 50 bar, preferably 15 to 35 bar.

Hydrogen is added in each reactor in order to control the molecular weight, i.e. the melt flow rate $MFR_2$.

Preferably the weight-ratio of co-catalyst (Co) to propylene (C3) [Co/C3], especially when considering the total propylene feed in the pre-polymerization and polymerization reactors together is in the range of 25 g/t to 40 g/t, more preferably in the range of 28 g/t to 38 g/t, yet more preferably in the range of 31 g/t to 37 g/t.

Preferably the weight-ratio of external donor (ED) to propylene (C3) [ED/C3], especially when considering the total propylene feed in the pre-polymerization and polymerization reactors together is in the range of 2.8 g/t to 4.8 g/t, more preferably in the range of 3.0 g/t to 4.6 g/t, yet more preferably in the range of 3.5 g/t to 4.5 g/t.

The residence time can vary in the reactors identified above. In some embodiments, the residence time in the first reactor (R1), for example in the loop reactor (LR), is in the range of from 0.3 to 5 hours, for example 0.4 to 2 hours, while the residence time in the subsequent reactors i.e. in the gas phase reactors, generally will be from 1 to 8 hours, for example 1 to 4 hours.

Accordingly the process according to the instant invention preferably comprises the following steps under the conditions set out above (a) in the pre-polymerization reactor (PR) propylene is reacted in the presence of ethylene and the Ziegler-Natta catalyst (ZN-C) comprising the pro-catalyst (PC), the external donor (ED) and the co-catalyst (Co), obtaining thereby a mixture (MI) of the produced polypropylene (Pre-PP) and the used Ziegler-Natta catalyst (ZN-C), (b) transferring said mixture (MI) comprising the Ziegler-Natta catalyst (ZN-C) and the polypropylene (Pre-PP) in the first polymerization reactor (R1), preferably in the loop reactor (LR), (c) in the first polymerization reactor (R1), preferably in the loop reactor (LR), propylene and optionally at least one other α-olefin, like optionally a $C_2$ to $C_{10}$ α-olefin other than propylene, is/are polymerized in the presence of the Ziegler-Natta catalyst (ZN-C) obtaining a first polypropylene fraction (PP-A) of the polypropylene (PP), (d) transferring said first polypropylene fraction (PP-A) to the second polymerization reactor (R2), preferably to the first gas phase reactor (GPR-1), (e) in the second polymerization reactor (R2), preferably in the first gas phase reactor (GPR-1), propylene and optionally at least one other α-olefin, like optionally a $C_2$ to $C_{10}$ α-olefin other than propylene, is/are polymerized in the presence of the first polypropylene fraction (PP-A) obtaining a second polypropylene fraction (PP-B) of the polypropylene (PP), said first polypropylene fraction (PP-A) and said second polypropylene fraction (PP-B) form a first mixture ($1^{st}$ M), (f) transferring said first mixture ($1^{st}$ M) to the third polymerization reactor (R3), preferably to the second gas phase reactor (GPR-2), and (g) in the third polymerization reactor (R3), preferably in the second gas phase reactor (GPR-2), propylene and optionally at least one other α-olefin, like optionally a $C_2$ to $C_{10}$ α-olefin other than propylene, is/are polymerized in the presence of the first mixture ($1^{st}$ M) obtaining a third polypropylene fraction (PP-C) of the polypropylene (PP), said first mixture ($1^{st}$ M) and said third polypropylene fraction (PP-C) form the polypropylene (PP).

According to a specific aspect the process according to the instant invention preferably comprises the following steps under the conditions set out above (a) in the pre-polymerization reactor (PR) propylene is reacted in the presence of ethylene and the Ziegler-Natta catalyst (ZN-C) comprising the pro-catalyst (PC), the external donor (ED) and the co-catalyst (Co), obtaining thereby a mixture (MI) of the produced polypropylene (Pre-PP) and the used Ziegler-Natta catalyst (ZN-C), (b) transferring said mixture (MI) comprising the Ziegler-Natta catalyst (ZN-C) and the polypropylene (Pre-PP) and un-reacted ethylene (C2) in the first polymerization reactor (R1), preferably in the loop reactor (LR), (c) in the first polymerization reactor (R1), preferably in the loop reactor (LR), propylene, ethylene and optionally at least one other α-olefin, like optionally a $C_4$ to $C_{10}$ α-olefin, are polymerized in the presence of the Ziegler-Natta catalyst (ZN-C) obtaining a first polypropylene fraction (PP-A) of the polypropylene (PP), (d) transferring said first polypropylene fraction (PP-A) to the second polymerization reactor (R2), preferably to the first gas phase reactor (GPR-1), (e) in the second polymerization reactor (R2), preferably in the first gas phase reactor (GPR-1), propylene and optionally at least one other α-olefin, like optionally a $C_2$ to $C_{10}$ α-olefin other than propylene, is/are polymerized in the presence of the first polypropylene fraction (PP-A) obtaining a second polypropylene fraction (PP-B) of the polypropylene (PP), said first polypropylene fraction (PP-A) and said second polypropylene fraction (PP-B) form a first mixture ($1^{st}$ M), (f) transferring said first mixture ($1^{st}$ M) to the third polymerization reactor (R3), preferably to the second gas phase reactor (GPR-2), and (g) in the third polymerization reactor (R3), preferably in the second gas phase reactor (GPR-2), propylene and optionally at least one other α-olefin, like optionally a $C_2$ to $C_{10}$ α-olefin other than propylene, is/are polymerized in the presence of the first mixture ($1^{st}$ M) obtaining a third polypropylene fraction (PP-C) of the polypropylene (PP), said first mixture ($1^{st}$ M) and said third polypropylene fraction (PP-C) form the polypropylene (PP).

Due to the transfer of the first polypropylene fraction (PP-A) and the first mixture ($1^{st}$ M), respectively automatically also the Ziegler-Natta catalyst (ZN-C) is transferred in the next reactors.

After step (g) the polypropylene (PP) is preferably discharged without any washing step. Accordingly in one preferred embodiment the polypropylene (PP) is not subjected to a washing step. In other words in a specific embodiment the polypropylene (PP) is not subjected to a washing step and thus is used unwashed in an application forming process.

Ziegler-Natta Catalyst (ZN-C)

As pointed out above in the specific process for the preparation of the polypropylene (PP) as defined above a Ziegler-Natta catalyst (ZN-C) is used. Accordingly the Ziegler-Natta catalyst (ZN-C) will be now described in more detail.

Accordingly the Ziegler-Natta catalyst (ZN-C) comprises
(a) a pro-catalyst (PC) comprising
  (a1) a compound of a transition metal (TM),
  (a2) a compound of a metal (M) which metal is selected from one of the groups 1 to 3 of the periodic table (IUPAC), and
  (a3) an internal electron donor (ID),
(b) a co-catalyst (Co), and
(c) an external donor (ED).

The metal of the compound of a transition metal (TM) is preferably selected from one of the groups 4 to 6, in particular of group 4, like titanium (Ti), of the periodic table (IUPAC). Accordingly the compound of the transition metal (TM) is preferably selected from the group consisting of titanium compound having an oxidation degree of 3 or 4, vanadium compound, chromium compound, zirconium compound, hafnium compound and rare earth metal compounds, more preferably selected from the group consisting of titanium compound, zirconium compound and hafnium compound, and most preferably the transition metal is a titanium compound. Moreover the compounds of the transition metal (TM) are in particular transition metal halides, such as transition metal chlorides. The titanium trichloride and titanium tetrachloride are particularly preferred. Especially preferred is titanium tetrachloride.

According to this invention the term "compound of transition metal" and the term "transition metal compound" are synonyms.

The compound of metal (M) is a compound which metal is selected from one of the groups 1 to 3 of the periodic table (IUPAC), preferably from the Group 2 metal. Usually the compound of metal (M) is titanium-less. Especially the compound of metal (M) is a magnesium compound, like $MgCl_2$.

Moreover as stated above the pro-catalyst (PC) comprises an internal electron donor (ID), which is chemically different to the external donor (ED) of the Ziegler-Natta catalyst (ZN-C), i.e. the internal donor (ID) preferably comprises, still more preferably, is a dialkylphthalate of formula (II)

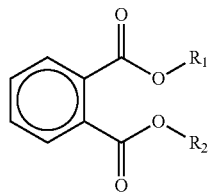

(II)

wherein $R_1$ and $R_2$ can be independently selected from a $C_1$ to $C_4$ alkyl, preferably $R_1$ and $R_2$ are the same, i.e. define the same $C_1$ to $C_4$ alkyl residue.

Preferably the internal donor (ID) comprises, like is, a n-dialkylphthalate of formula (II), wherein $R_1$ and $R_2$ can be independently selected from a $C_1$ to $C_4$ n-alkyl, preferably $R_1$ and $R_2$ are the same, i.e. define the same $C_1$ to $C_4$ n-alkyl residue. Still more preferably the internal donor (ID) comprises, like is, n-dialkylphthalate of formula (II), wherein $R_1$ and $R_2$ can be independently selected from a $C_1$ and $C_2$ alkyl, preferably $R_1$ and $R_2$ are the same, i.e. define the same $C_1$ or $C_2$ alkyl residue. Still more preferably the internal donor (ID) comprises, like is, diethylphthalate.

Of course the above defined and further below defined pro-catalyst (PC) is preferably a solid, supported pro-catalyst composition.

Moreover it is preferred that the pro-catalyst (PC) contains not more than 2.5 wt.-% of the transition metal (TM), preferably titanium. Still more preferably the pro-catalyst contains 1.7 to 2.5 wt.-% of the transition metal (TM), preferably titanium. Additionally it is appreciated that the molar ratio of internal donor (ID) to metal (M), like Mg, of the pro-catalyst [ID/M] is between 0.03 and 0.08, still more preferably between 0.04 and 0.06, and/or its internal donor (ID) content is between 4 and 15 wt.-%, still more preferably between 6 and 12 wt.-%.

Furthermore it is preferred that the internal donor (ID) is the result of a transesterification of a dialkylphthalate of formula (I) with an alcohol. It is in particular preferred that the pro-catalyst (PC) is a pro-catalyst (PC) as produced in the patent applications WO 87/07620, WO 92/19653, WO 92/19658 and EP 0 491 566. The content of these documents is herein included by reference.

The metal of the compound of a transition metal (TM) is preferably selected from one of the groups 4 to 6, in particular of group 4, like titanium (Ti), of the periodic table (IUPAC). Accordingly it is preferred that the pro-catalyst (PC) is prepared by bringing together (a) a compound of a transition metal (TM), preferably a transition metal (TM) compound selected from one of the groups 4 to 6, more preferably a transition metal (TM) compound of group 4, like titanium (Ti) compound, of the periodic table (IUPAC), in particular a titanium halide, like $TiCl_3$ or $TiCl_4$, the latter especially preferred,
(b) a compound of a metal (M) which metal is selected from one of the groups 1 to 3 of the periodic table (IUPAC), preferably a compound of magnesium, like $MgCl_2$,
(c) a $C_1$ to $C_4$ alcohol, preferably a $C_1$ to $C_2$ alcohol, like methanol or ethanol, most preferably ethanol and
(d) a dialkylphthalate of formula (I),

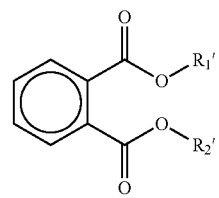

(I)

wherein $R_1'$ and $R_2'$ have more carbon atoms as said alcohol, preferably are independently at least a $C_5$ alkyl, like at least a $C_8$ alkyl, more preferably $R_1'$ and $R_2'$ are the same and are at least a $C_5$ alkyl, like at least a $C_8$ alkyl, or preferably a n-dialkylphthalate of formula (I) wherein $R_1'$ and $R_2'$ have more carbon atoms as said alcohol, preferably are independently at least a $C_5$ n-alkyl, like at least a $C_8$ n-alkyl, more preferably $R_1'$ and $R_2'$ are the same and are at least a $C_5$ n-alkyl, like at least a $C_8$ n-alkyl or more preferably dioctyl phthalate, like di-iso-octylphthalate or diethylhexyl phthalate, yet more preferably diethylhexyl phthalate, wherein a transesterification between said alcohol and said dialkylphthalate of formula (I) has been carried out under suitable transesterification conditions, i.e. at a temperature between 130 to 150° C.

Among others the preferred dialkylphthalate of formula (I) for the above and further down described process for the manufacture of the pro-catalyst (PC) is selected from the group consisting of propylhexyl phthalate (PrHP), dioctylphthalate (DOP), di-iso-decyl phthalate (DIDP), diundecyl phthalate, diethylhexylphthalate and ditridecyl phthalate (DTDP). The most preferred dialkylphthalate is dioctylphthalate (DOP), like di-iso-octylphthalate or diethylhexylphthalate, in particular diethylhexylphthalate.

Preferably at least 80 wt.-%, more preferably at least 90 wt.-%, of the dialkylphthalate of formula (I) is transesterified to the dialkylphthalate of formula (II) as defined above.

It is particular preferred that the pro-catalyst (PC) is prepared by
(a) contacting a spray crystallized or solidified adduct of the formula $MgCl_2*nEtOH$, wherein n is 1 to 6, with $TiCl_4$ to form a titanised carrier,
(b) adding to said titanised carrier
(i) a dialkylphthalate of formula (I) with $R_1'$ and $R_2'$ being independently at least a $C_5$ alkyl, like at least a $C_8$ alkyl, or preferably (ii) a dialkylphthalate of formula (I) with $R_1'$ and $R_2'$ being the same and being at least a $C_5$ alkyl, like at least a $C_8$ alkyl
or more preferably
(iii) a dialkylphthalate of formula (I) selected from the group consisting of propylhexyl phthalate (PrHP), dioctylphthalate (DOP), di-iso-decyl phthalate (DIDP), and ditridecyl phthalate (DTDP), yet more preferably the dialkylphthalate of formula (I) is dioctylphthalate (DOP), like di-iso-octylphthalate or diethylhexylphthalate, in particular diethylhexylphthalate, to form a first product (c) subjecting said first product to suitable transesterification conditions, i.e. at a temperature between 130 to 150° C. such that said ethanol is transesterified with said ester groups of said dialkylphthalate of formula (I) to form preferably at least 80 mol-%, more preferably 90 mol-%, most preferably 95 mol.-%, of a dialkylphthalate of formula (II) with $R_1$ and $R_2$ being —$CH_2CH_3$, and (d) recovering said transesterification product as the pro-catalyst (PC).

As a further requirement the Ziegler-Natta catalyst (ZN-C) comprises a co-catalyst (Co). Preferably the co-catalyst (Co) is a compound of group 13 of the periodic table (IUPAC), e.g. organo-aluminum, such as an aluminium compound, like aluminium alkyl, aluminium halide or aluminium alkyl halide compound. Accordingly in one specific embodiment the co-catalyst (Co) is a trialkylaluminium, like triethylaluminium (TEA), dialkyl aluminium chloride or alkyl aluminium sesquichloride. In one specific embodiment the co-catalyst (Co) is triethylaluminium (TEA).

Additionally the Ziegler-Natta catalyst (ZN-C) must comprise an external donor (ED). Preferably the external donor (ED) is a hydrocarbyloxy silane derivative. Accordingly in one specific embodiment the external donor (ED) is represented by formula (IIIa) or (IIIb).

Formula (IIIa) is defined by

$$Si(OCH_3)_2R_2^5 \quad (IIIa)$$

wherein $R^5$ represents a branched-alkyl group having 3 to 12 carbon atoms, preferably a branched-alkyl group having 3 to 6 carbon atoms, or a cycloalkyl having 4 to 12 carbon atoms, preferably a cycloalkyl having 5 to 8 carbon atoms.

It is in particular preferred that $R^5$ is selected from the group consisting of iso-propyl, iso-butyl, iso-pentyl, tert.-butyl, tert.-amyl, neopentyl, cyclopentyl, cyclohexyl, methylcyclopentyl and cycloheptyl.

Formula (IIIb) is defined by

$$Si(OCH_2CH_3)_3(NR^xR^y) \quad (IIIb)$$

wherein $R^x$ and $R^y$ can be the same or different a represent a hydrocarbon group having 1 to 12 carbon atoms.

$R^x$ and $R^y$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^x$ and $R^y$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^x$ and $R^y$ are the same, yet more preferably both $R^x$ and $R^y$ are an ethyl group.

More preferably the external donor (ED) is selected from the group consisting of diethylaminotriethoxysilane [Si(OCH$_2$CH$_3$)$_3$(N(CH$_2$CH$_3$)$_2$)] (U-donor), dicyclopentyl dimethoxy silane [Si(OCH$_3$)$_2$(cyclo-pentyl)$_2$] (D-donor), diisopropyl dimethoxy silane [Si(OCH$_3$)$_2$(CH(CH$_3$)$_2$)$_2$] (P-donor) and mixtures thereof. Most preferably the external donor is dicyclopentyl dimethoxy silane [Si(OCH$_3$)$_2$(cyclo-pentyl)$_2$] (D-donor).

Accordingly, especially good results are achieved with a Ziegler-Natta catalyst (ZN-C) comprising
(a) a pro-catalyst (PC) comprising titanium, MgCl$_2$, and internal donor (ID), wherein said internal donor (ID) comprises, preferably is,
(i) a dialkylphthalate of formula (II),

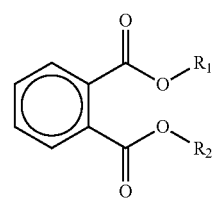

wherein $R_1$ and $R_2$ are independently selected from a $C_1$ to $C_4$ alkyl,
preferably $R_1$ and $R_2$ are the same, i.e. define the same $C_1$ to $C_4$ alkyl residue, or preferably
(ii) a n-dialkylphthalate of formula (II), wherein $R_1$ and $R_2$ can be independently selected from a $C_1$ to $C_4$ n-alkyl, preferably $R_1$ and $R_2$ are the same, i.e. define the same $C_1$ to $C_4$ n-alkyl residue,
or more preferably
(iii) a n-dialkylphthalate of formula (II), wherein $R_1$ and $R_2$ can be independently selected from a $C_1$ and $C_2$ alkyl, preferably $R_1$ and $R_2$ are the same, i.e. have the same $C_1$ or $C_2$ alkyl residue,
or still more preferably
(iv) diethylphthalate,
(b) a cocatalyst (Co) being trialkylaluminium, dialkyl aluminium chloride or alkyl aluminium sesquichloride, preferably triethylaluminium (TEA), and
(c) an external donor (ED) being selected from the group consisting of diethylaminotriethoxysilane [Si(OCH$_2$CH$_3$)$_3$(N(CH$_2$CH$_3$)$_2$)], dicyclopentyl dimethoxy silane [Si(OCH$_3$)$_2$(cyclo-pentyl)$_2$] (D-donor), diisopropyl dimethoxy silane [Si(OCH$_3$)$_2$(CH(CH$_3$)$_2$)$_2$] (P-donor) and mixtures thereof, more preferably being dicyclopentyl dimethoxy silane [Si(OCH$_3$)$_2$(cyclo-pentyl)$_2$].

If desired the Ziegler-Natta catalyst (ZN-C) is modified by polymerizing a vinyl compound in the presence of said catalyst, wherein the vinyl compound has the formula:

$$CH_2=CH—CHR^3R^4$$

wherein $R^3$ and $R^4$ together form a 5- or 6-membered saturated, unsaturated or aromatic ring or independently represent an alkyl group comprising 1 to 4 carbon atoms.

More preferably said pro-catalyst (PC) has been produced as defined above and also described in the patent applications WO 92/19658, WO 92/19653 and EP 0 491 566 A2. The co-catalyst (Co) as well as the external donor (ED) are fed to the pre-polymerization reactor.

A preferred aspect of the present invention is that the ratio between on the one hand of co-catalyst (Co) and the external donor (ED) [Co/ED] and on the other hand of the co-catalyst (Co) and the transition metal (TM) [Co/TM] have been carefully chosen.

Accordingly
(a) the mol-ratio of co-catalyst (Co) to external donor (ED) [Co/ED] is preferably in the range of above 10 to below 25, preferably is in the range of 12 to 23, yet more preferably is in the range of 15 to 22, and/or
(b) the mol-ratio of co-catalyst (Co) to transition metal (TM) [Co/TM] is preferably in the range of above 100 to below 200, preferably is in the range of 110 to 195, more preferably is in the range of 120 to 190, still more preferably is in the range of 125 to 185, yet more preferably is in the range of 128 to 182.

The Polypropylene (PP)

With the above described process including the specific defined Ziegler-Natta catalyst (ZN-C) a polypropylene (PP) can be produced with high productivity. Accordingly, the polypropylene (PP) is in particular featured by low ash content, in particular by low ash content without any purification, i.e. washing step. Accordingly the polypropylene (PP) has an ash content of below 45 ppm, i.e. in the range of 10 to below 45 ppm, preferably of below 40 ppm, i.e. 15 to below 40 ppm, more preferably in the range of 20 to 38 ppm.

Any polypropylene (PP) can be produced with the instant process including complex structures, like heterophasic systems, i.e. a composition comprising a polypropylene matrix in which an elastomeric propylene copolymer is dispersed. However it is preferred that the polypropylene (PP) according to this invention is featured by rather low cold xylene soluble (XCS) content, i.e. by a xylene cold soluble (XCS) of below 10 wt.-%, and thus is not regarded as a heterophasic system. Accordingly the polypropylene (PP) has preferably a xylene cold soluble content (XCS) in the range of 0.3 to 6.0 wt.-%, more preferably 0.5 to 5.5 wt.-%, still more preferably 1.0 to 4.0 wt.-%.

Accordingly the polypropylene (PP) is preferably crystalline. The term "crystalline" indicates that the polypropylene (PP) has a rather high melting temperature. Accordingly throughout the invention the polypropylene (PP) is regarded as crystalline unless otherwise indicated. Therefore the polypropylene (PP) has preferably a melting temperature more than 120° C., more preferably more than 125° C., still more preferably more than 130° C., like in the range of more than 130 to 168° C., yet more preferably of more than 160° C., like of more than 160 to 168, still yet of more preferably more than 163° C., like of more than 163 to 168° C.

Additionally or alternatively it is appreciated that the polypropylene (PP) has a rather high crystallization temperature. Thus it is preferred that the polypropylene (PP) has a crystallization temperature of at least 110° C., more preferably of at least 112° C. Accordingly the polypropylene (PP) has a crystallization temperature in the range of 110 to 128° C., more preferably in the range of 112 to 128° C., yet more preferably in the range of 112 to 125° C.

A further characteristic of the polypropylene (PP) is the low amount of misinsertions of propylene within the polymer chain, which indicates that the polypropylene (PP) is produced in the presence of a catalyst as defined above, i.e. in the presence of a Ziegler-Natta catalyst (ZN-C). Accordingly the polypropylene (PP) is preferably featured by low amount of 2,1 erythro regio-defects, i.e. of equal or below 0.4 mol.-%, more preferably of equal or below than 0.2 mol.-%, like of not more than 0.1 mol.-%, determined by $^{13}$C-NMR spectroscopy. In an especially preferred embodiment no 2,1 erythro regio-defects are detectable.

Due to the low amounts of regio-defects the polypropylene (PP) is additionally characterized by a high content of thick lamellae. The specific combination of rather high mmmm pentad concentration and low amount of regio-defects has also impact on the crystallization behaviour of the polypropylene (PP). Thus, the polypropylene (PP) of the instant invention is featured by long crystallisable sequences and thus by a rather high amount of thick lamellae. To identify such thick lamellae the stepwise isothermal segregation technique (SIST) is the method of choice. Therefore, the polypropylene (PP) can be additionally or alternatively defined by the crystalline fractions melting in the temperature range of above 170 to 180° C. Accordingly it is preferred that the polypropylene (PP) has a crystalline fraction melting above 170 to 180° C. of at least 14.0 wt.-%, more preferably in the range of 14.0 to equal or below 30.0 wt.-%, still more preferably in the range of 15.0 to 25.0 wt.-%, wherein said fraction is determined by the stepwise isothermal segregation technique (SIST).

Further it is preferred that the polypropylene (PP) has a crystalline fraction melting above 160 to 170° C. of more than 36.0 wt.-%, more preferably in the range of more than 36.0 to equal or below 45.0 wt.-%, still more preferably in the range of more than 38.0 to 43.0 wt.-% wherein said fraction is determined by the stepwise isothermal segregation technique (SIST).

In one preferred embodiment of the present invention the polypropylene (PP) has an $MFR_2$ (230° C.) of equal or below 7.0 g/10 min, more preferably in the range of 0.5 to 7.0 g/10 min, yet more preferably in the range of 1.0 to 5.0 g/10 min, still more preferably in the range of 1.5 to 4.0 g/10 min.

Alternatively or additionally the polypropylene (PP) is defined by its crossover frequency $\omega_c$ (a parameter corresponding to the weight average molecular weight), said crossover frequency $\omega_c$ is the frequency at which the storage modulus G' and the loss modulus G" determined in a dynamic-mechanical rheology test are identical and defined as crossover modulus $G_c$. Thus it is appreciated that the polypropylene (PP) has a crossover frequency $\omega_c$ as determined by dynamic rheology according to ISO 6271-10 at 200° C. of equal or above 10.0 rad/s, more preferably equal or above 12.0 rad/s, still more preferably equal or above 14.0 rad/s, yet more preferably in the range of equal or above 12.0 to 24.0 rad/s, still yet more preferably in the range of 13.0 to 22.0 rad/s, like in the range of 14.0 to 20.0 rad/s.

Further it is appreciated that the polypropylene (PP) is featured by a moderate molecular weight distribution. Accordingly it is required that the polypropylene (PP) has a polydispersity index (PI), defined as $10^5/G_c$ with $G_c$ being the crossover modulus from dynamic rheology according to ISO 6271-10 at 200° C., of at least 2.5, more preferably in the range of 2.5 to below 5.5, still more preferably in the range of 3.0 to 5.0, like 3.4 to 4.5.

Alternatively or additionally the polypropylene (PP) has a shear thinning index SHI (0/100) measured according to ISO 6271-10 at 200° C. of at least 20, more preferably of at least 22, yet more preferably in the range of 20 to below 50, still more preferably in the range of 22 to 45, like in the range of 25 to 40 or in the range of 28 to 45.

As mentioned above one essential aspect of the present invention is that ethylene is fed in the pre-polymerization reactor (PR). Preferably, un-reacted ethylene is transferred from the pre-polymerization reactor (PR) to the first reactor (R1), like loop reactor (LR). Accordingly the polypropylene (Pre-PP) as well as the first polypropylene fraction (PP-A) contain ethylene and thus also to some extent the final polypropylene (PP). Of course also additional comonomers can be fed in one of the reactors which follow the pre-polymerization reactor (PR). Accordingly the polypropylene (PP) comprises propylene, ethylene and optionally α-olefins, like $C_4$ to $C_{10}$ α-olefins, in particular $C_4$ to $C_8$ α-olefins, e.g. 1-butene and/or 1-hexene. Preferably the polypropylene (PP) comprises propylene, ethylene, and optionally 1-butene and/or 1-hexene. More specifically, the polypropylene (PP) comprises units derivable from propylene and ethylene only (ethylene-propylene copolymer (E-PP)).

The comonomer content, preferably the ethylene content, in the polypropylene (PP) is preferably relatively low, i.e. below 10 wt.-% or more preferably equal or below 5.0 wt.-%. In one preferred embodiment, the comonomer content, preferably the ethylene content, is preferably more than 0.05 wt.-% to 5.00 wt.-%, more preferably between 0.10 wt.-% and 2.0 wt.-%, still more preferably between 0.15 wt.-% and 1.50 wt.-%, yet more preferably between 0.20 to 1.00 wt.-%, still yet more preferably between 0.20 wt.-% and 0.80 wt.-%, like between 0.20 to 0.60 wt.-%, based on the total weight of the polypropylene (PP). Preferably the ethylene content in the polypropylene (PP), preferably being an ethylene-propylene copolymer (E-PP), originate from the ethylene feed in the pre-polymerization reactor. Accordingly in one specific embodiment the polypropylene (PP) is an ethylene-propylene copolymer (E-PP) with an ethylene content as stated in this paragraph and the remaining part up to 100 wt.-% constitute propylene.

In case of that in addition to the ethylene feed in the pre-polymerization reactor (PR) additional ethylene and/or $C_4$ to $C_{10}$ α-olefins is/are added, this is accomplished in at least one of the steps (c), (e), and (g) as mentioned above, more preferably in all three steps. However in a preferred embodiment only in the pre-polymerization step (a), i.e. in the pre-polymerization reactor (PR), ethylene is fed and in any subsequent reactor no new comonomer is fed in the reactor(s).

As mentioned in the section "polymerization process" the instant polypropylene (PP) is produced in at least two reactors, preferably in three reactors. Accordingly the instant polypropylene (PP) comprises, preferably consists of, three fractions (apart from the polypropylene (Pre-PP)). Thus the polypropylene (PP) preferably comprises (a) 15 to 40 wt.-%, preferably 20 to 35 wt.-%, of a first polypropylene fraction (PP-A), preferably produced in the first reactor (R1), (b) 25 to 50 wt.-%, preferably 30 to 45 wt.-%, of a second polypropylene fraction (PP-B), preferably produced in the second reactor (R2), and (c) 15 to 40 wt.-%, preferably 25 to 35 wt.-%, of a third polypropylene fraction (PP-C), preferably produced in the third reactor (R3), wherein the amount is based on the total weight of the polypropylene (PP), preferably the amount is based on the total weight of the first polypropylene fraction (PP-A), second polypropylene fraction (PP-B), and third polypropylene fraction (PP-C) together.

Preferably the first polypropylene fraction (PP-A) is an ethylene-propylene copolymer fraction (E-PP-A). On the other hand the second polypropylene fraction (PP-B) and third polypropylene fraction (PP-C) can be either propylene copolymers fractions, like ethylene-propylene copolymer fractions [(E-PP-B) and (E-PP-C)], or are propylene homopolymer fractions [(H-PP-B) and (H-PP-C)]. Accordingly in one preferred embodiment the first polypropylene fraction (PP-A) is an ethylene-propylene copolymer fraction (E-PP-A) whereas the second polypropylene fraction (PP-B) and the third polypropylene fraction (PP-C) are a first propylene homopolymer fraction (H-PP-B) and a second propylene homopolymer fraction (H-PP-C), respectively.

Accordingly in one preferred embodiment the first polypropylene fraction (PP-A), like the ethylene-propylene copolymer fraction (E-PP-A), differ from the second polypropylene fraction (PP-B), like the first propylene homopolymer fraction (H-PP-B), and third polypropylene fraction (PP-C), like the second propylene homopolymer fraction (H-PP-C), in the ethylene content, preferably in the total comonomer content.

Accordingly it is preferred that the ethylene content of the first polypropylene fraction (PP-A), like of the ethylene-propylene copolymer fraction (E-PP-A), is higher than the ethylene content, preferably higher than the total comonomer content, of the second polypropylene fraction (PP-B), like of the first propylene homopolymer fraction (H-PP-B), and third polypropylene fraction (PP-C), like of the second propylene homopolymer fraction (H-PP-C). Thus the ethylene content of the first polypropylene fraction (PP-A), of the ethylene-propylene copolymer fraction (E-PP-A), is higher than the ethylene content, preferably higher than the total comonomer content, of the polypropylene (PP). Even more preferred the ethylene content of the first polypropylene fraction (PP-A), of the ethylene-propylene copolymer fraction (E-PP-A), is at least 0.50 wt.-%, more preferably 0.60 to 1.50 wt.-%, yet more preferably 0.70 to 1.30 wt.-%, higher than the ethylene content, preferably higher than the total comonomer content, of the polypropylene (PP).

Preferably the ethylene content of the first polypropylene fraction (E-PP-A) is at least 0.50 wt.-%, more preferably in the range of 0.50 to 5.00 wt.-%, more preferably in the range of 0.80 to 3.50 wt.-%, still more preferably in the range of 1.00 to 2.50 w.-%.

The expression polypropylene homopolymer used in the instant invention relates to a polypropylene that consists substantially, i.e. of more than 99.50 wt.-%, more preferably of more than 99.90 wt.-%, of propylene units. In one specific embodiment the expression polypropylene homopolymer shall indicate that the polymer contains no comonomer at all.

In addition to differences in the comonomer content the individual fractions of the polypropylene (PP) may also differ in the molecular weight. In such a case the individual fractions may differ in the melt flow rate $MFR_2$, but not necessarily. When the melt flow rates $MFR_2$ of the individual fractions of the polypropylene (PP) do not substantially differ, the polypropylene (PP) is referred to as monomodal. On the other hand, if there are substantial differences in the melt flow rates of the individual fractions, the polypropylene (PP) is referred to as multimodal, such as bimodal ((PP-A) and (PP-B)) or trimodal ((PP-A), (PP-B), and (PP-C)), depending on the number of fractions having different melt flow rates. Accordingly in one embodiment the polypropylene (PP) is monomodal wherein each polypropylene fraction ((PP-A), (PP-B), and (PP-C)) has a similar melt flow rate $MFR_2$, i.e. differ not more than +/−1.3 g/10 min, more preferably differ not more than +/−1.0 g/10 min, from each other. Therefore in one specific embodiment the polypropylene (PP) is monomodal wherein the ethylene-propylene copolymer fraction (E-PP-A), the second polypropylene fraction (PP-B), like the first propylene homopolymer fraction (H-PP-B), and the third polypropylene fraction (PP-C), like the second propylene homopolymer fraction (H-PPC), have a similar melt flow rate $MFR_2$, i.e. differ not more than +/−1.3 g/10 min, more preferably differ not more than +/−1.0 g/10 min, from each other.

In another embodiment, the polypropylene (PP) is a multimodal polypropylene (PP), wherein each polypropylene fraction present, preferably each of the polypropylene fractions (PP-A), (PP-B), and (PP-C), has a different melt flow rate MFR$_2$, i.e. differ by more than +/−1.3 g/10 min, more preferably differ by more than +/−1.5 g/10 min, still more preferably differ from by more than 1.3 g/10 min to not more than +/−7.0 g/10 min, yet more preferably differ from by more than 1.5 g/10 min to not more than +/−6.5 g/10 min, from each other. According to this embodiment, it is still further preferred that the first polypropylene fraction (PP-A) has the lowest melt flow rate MFR$_2$, of all polypropylene fractions produced in the polymerization reactors, preferably of all three polypropylene fractions (PP-A), (PP-B), and (PP-C), and/or the second polypropylene fraction (PP-B) has the highest melt flow rate MFR$_2$ of all polypropylene fractions produced in the polymerization reactors, preferably of all three polypropylene fractions (PP-A), (PP-B), and (PP-C). According to this paragraph in one especially preferred paragraph the polypropylene fraction (PP-A) is the ethylene-propylene copolymer fraction (E-PP-A), whereas the second polypropylene fraction (PP-B) and the third polypropylene fraction (PP-C) are the first propylene homopolymer fraction (H-PP-B) and the second propylene homopolymer fraction (H-PPC), respectively.

In one specific embodiment
(a) the first polypropylene fraction (PP-A) has the lowest melt flow rate MFR$_2$,
(b) the second polypropylene fraction (PP-B) has the highest melt flow rate MFR$_2$, and
(c) the third polypropylene fraction (PP-C) has a melt flow rate MFR$_2$ in-between the melt flow rate MFR$_2$ of the first polypropylene fraction (PP-A) and the melt flow rate MFR$_2$ of the second polypropylene fraction (PP-B),
of all fractions produced in the polymerization reactors, preferably of all three polypropylene fractions (PP-A), (PP-B), and (PP-C). Preferably the polypropylene fraction (PP-A) is the ethylene-propylene copolymer fraction (E-PP-A), whereas the second polypropylene fraction (PP-B) and the third polypropylene fraction (PP-C) are the first propylene homopolymer fraction (H-PP-B) and the second propylene homopolymer fraction (H-PPC), respectively.

In one more specific embodiment
(a) the first polypropylene fraction (PP-A) has the lowest melt flow rate MFR$_2$,
(b) the second polypropylene fraction (PP-B) has the highest melt flow rate MFR$_2$, and
(c) the third polypropylene fraction (PP-C) has a melt flow rate MFR$_2$ in-between the melt flow rate MFR$_2$ of the first polypropylene fraction (PP-A) and the melt flow rate MFR$_2$ of the second polypropylene fraction (PP-B) of all fractions produced in the polymerization reactors, preferably of all three polypropylene fractions (PP-A), (PP-B), and (PP-C),
wherein optionally further
(d) the first polypropylene fraction (PP-A) is the ethylene-propylene copolymer fraction (E-PP-A) having an ethylene content of at least 0.50 wt.-%, more preferably in the range of 0.50 to 5.00 wt.-%, more preferably in the range of 0.80 to 3.50 wt.-%, still more preferably in the range of 1.00 to 2.50 w.-%.
(e) the second polypropylene fraction (PP-B) is the first propylene homopolymer fraction (H-PP-B) and/or the third polypropylene fraction (PP-C) is the second propylene homopolymer fraction (H-PPC).

Accordingly it is preferred that the first polypropylene fraction (PP-A) of a multimodal propylene polymer (PP), preferably the ethylene-propylene copolymer fraction (E-PP-A), has a melt flow rate (MFR$_2$) measured according to ISO 1133 of not more than 2.0 g/10 min, preferably in the range of 0.05 to 2.0 g/10 min, more preferably in the range of 0.1 to 1.5 g/10 min and/or the second polypropylene fraction (PP-B), preferably the first propylene homopolymer fraction (H-PP-B), has a melt flow rate (MFR$_2$) measured according to ISO 1133 of at least 3.0 g/10 min, preferably in the range of 3.0 to 10.0 g/10 min, more preferably in the range of 4.0 to 8.0 g/10 min. Additionally it is preferred the third polypropylene fraction (PP-C), preferably the second propylene homopolymer fraction (H-PP-C), has a melt flow rate (MFR$_2$) measured according to ISO 1133 of in the range of 1.5 to 6.0 g/10 min, preferably in the range of 2.0 to 5.0 g/10 min, more preferably in the range of 2.5 to 4.0 g/10 min.

Preferably the first polypropylene fraction (PP-A), preferably the ethylene-propylene copolymer fraction (E-PP-A), is produced in the first reactor (R1), preferably in the loop reactor, whereas the second polypropylene fraction (PP-B), preferably the first propylene homopolymer fraction (H-PP-B), is produced in the second reactor (R2), preferably in the first gas phase reactor (GPR-1). Further preferred the third polypropylene fraction (PP-C), preferably the second propylene homopolymer fraction (H-PP-C), is produced in the third reactor (R2), preferably in the second gas phase reactor (GPR-2).

Accordingly in one preferred embodiment, the polypropylene (PP) comprises the ethylene-propylene copolymer fraction (E-PP-A), the first propylene homopolymer fraction and the second propylene homopolymer fraction (H-PP-C).

In one specific embodiment the present invention is directed to a polypropylene (PP) being monomodal and comprising, preferably consisting of, the ethylene-propylene copolymer fraction (E-PP-A), the first propylene homopolymer fraction the second propylene homopolymer fraction (H-PP-C) and the polypropylene (Pre-PP), wherein said polypropylene (PP) has
(a) an overall melt flow rate (MFR$_2$) measured according to ISO 1133 in the range of 0.5 to 7.0 g/10 min, preferably in the range of 1.0 to 5.0 g/10 min, more preferably in the range of 1.5 to 4.0 g/10 min, and
(b) a melting temperature T$_m$ of more than 163° C., preferably in the range of more than 163 to 168° C., and/or a crystallization temperature T$_c$ of more than 110° C., preferably in the range of more than 110 to 128° C., more preferably in the range of more than 112 to 125° C.

In another specific embodiment the present invention is directed to a polypropylene (PP) being trimodal and comprising, preferably consisting of, (apart from the polypropylene (Pre-PP)) the ethylene-propylene copolymer fraction (E-PP-A), the first propylene homopolymer fraction and the second propylene homopolymer fraction (H-PP-C), wherein said polypropylene (PP) has
(a) an overall melt flow rate (MFR$_2$) measured according to ISO 1133 in the range of 0.5 to 7.0 g/10 min, preferably in the range of 1.0 to 5.0 g/10 min, more preferably in the range of 1.5 to 4.0 g/10 min, and
(b) a melting temperature T$_m$ of more than 163° C., preferably in the range of more than 163 to 168° C., and/or a crystallization temperature T$_c$ of more than 110° C., preferably in the range of more than 110 to 128° C., more preferably in the range of more than 112 to 125° C.
wherein
(i) said ethylene-propylene copolymer fraction (E-PP-A) has
(i.i) a melt flow rate (MFR$_2$) measured according to ISO 1133 of not more than 2.0 g/10 min, preferably in the range of 0.05 to 2.0 g/10 min, more preferably in the range of 0.1 to 1.5 g/10 min,
(i.ii) ethylene content of at least 0.50 wt.-%, more preferably in the range of 0.50 to 5.00 wt.-%, more preferably in the range of 0.80 to 3.50 wt.-%, still more preferably in the range of 1.00 to 2.50 w.-%, (ii) said first propylene homopolymer fraction (H-PP-B) has a melt flow rate (MFR$_2$) measured according to ISO 1133 of at least 3.0 g/10 min, preferably in the range of 3.0 to 10.0 g/10 min, more preferably in the range of 4.0 to 8.0 g/10 min, and (iii) said second propylene homopolymer fraction (H-PP-C) has a melt flow rate (MFR$_2$) measured according to ISO 1133 of in the range of 1.5 to 6.0 g/10 min, preferably in the range of 2.0 to 5.0 g/10 min, more preferably in the range of 2.5 to 4.0 g/10 min.

Preferably the unimodal polypropylene (PP) and the trimodal polypropylene (PP) have further (a) an ash content below 45 ppm, preferably below 40 ppm, more preferably in the range of 10 to below 45 ppm, still more preferably in the range of 15 to below 40 ppm, yet more preferably in the range of 20 to 38 ppm, and/or (b) a shear thinning index (0/100) measured according to ISO 6271-10 (200° C.) of at least 20, more preferably of at least 22, yet more preferably in the range of 20 to below 50, still more preferably in the range of 22 to 45, like in the range of 25 to 40 or in the range of 28 to 45, and/or (c) a polydispersity index (PI) of at least 2.5, more preferably in the range of 2.5 to below 5.5, still more preferably in the range of 3.0 to 5.0, like 3.4 to 4.5.

Thus in one specific aspect the present invention is also directed to a polypropylene (PP), said polypropylene is an ethylene-propylene copolymer (E-PP) having (a) a melt flow rate (MFR$_2$) measured according to ISO 1133 in the range of 0.5 to 7.0 g/10 min, preferably in the range of 1.0 to 5.0 g/10 min, more preferably in the range of 1.5 to 4.0 g/10 min, (b) a melting temperature T$_m$ of more than 160° C., preferably in the range of 160 to 168 C, more preferably of more than 163° C., even more preferably in the range of more than 163 to 168° C., and (c) an ethylene content of more than 0.05 wt.-% to 5.00 wt.-%, more preferably between 0.10 wt.-% and 2.00 wt.-%, still more preferably between 0.15 wt.-% and 1.50 wt.-%, yet more preferably between 0.20 to 1.00 wt.-%, still yet more preferably between 0.20 wt.-% and 0.80 wt.-%, like between 0.20 to 0.60 wt.-%, based on the total weight of the polypropylene (PP).

Optionally said ethylene-propylene copolymer (E-PP) of the previous paragraph is further featured by (d) a crystallization temperature T$_c$ of more than 110° C., preferably in the range of more than 110 to 128° C., more preferably in the range of more than 112 to 125° C., and/or (e) 2,1 erythro regio-defects of equal or below 0.4 mol.-%, preferably of equal or below than 0.2 mol.-%, more preferably of not more than 0.1 mol.-%, yet more preferably 2,1 erythro regio-defects are not detectable, determined by $^{13}$C-NMR spectroscopy, and/or (f) a crystalline fraction melting above 170 to 180° C. of at least 14.0 wt.-%, more preferably in the range of 14.0 to equal or below 30.0 wt.-%, still more preferably in the range of 15.0 to 25.0 wt.-%, and optionally a crystalline fraction melting above 160 to 170° C. of more than 36.0 wt.-%, more preferably in the range of more than 36.0 to equal or below 45.0 wt.-%, still more preferably in the range of more than 38.0 to 43.0 wt.-%, wherein said fractions are determined by the stepwise isothermal segregation technique (SIST), and/or (g) an ash content below 45 ppm, preferably below 40 ppm, more preferably in the range of 10 to below 45 ppm, still more preferably in the range of 15 to below 40 ppm, yet more preferably in the range of 20 to 38 ppm, and/or (h) a shear thinning index (0/100) measured according to ISO 6271-10 (200° C.) of at least 20, more preferably of at least 22, yet more preferably in the range of 20 to below 50, still more preferably in the range of 22 to 45, like in the range of 25 to 40 or in the range of 28 to 45, and/or (i) a polydispersity index (PI) of at least 2.5, more preferably in the range of 2.5 to below 5.5, still more preferably in the range of 3.0 to 5.0, like 3.4 to 4.5.

In one embodiment said ethylene-propylene copolymer (E-PP) is unimodal and comprises an ethylene-propylene copolymer fraction (E-PP-A), a first propylene homopolymer fraction (H-PP-B) and a second propylene homopolymer fraction (H-PP-C), wherein said ethylene-propylene copolymer fraction (E-PP-A) has an ethylene content of at least 0.50 wt.-%, more preferably in the range of 0.50 to 5.00 wt.-%, more preferably in the range of 0.80 to 3.50 wt.-%, still more preferably in the range of 1.00 to 2.50 w.-%, and wherein further each polypropylene fraction ((E-PP-A), (H-PP-B), and (H-PP-C)) has a similar melt flow rate MFR$_2$, i.e. differ not more than +/−1.3 g/10 min, more preferably differ not more than +/−1.0 g/10 min, from each other.

In another preferred embodiment said ethylene-propylene copolymer (E-PP) is multimodal, like trimodal, and comprises (i) an ethylene-propylene copolymer fraction (E-PP-A) having (i.i) a melt flow rate (MFR$_2$) measured according to ISO 1133 of not more than 2.0 g/10 min, preferably in the range of 0.05 to 2.0 g/10 min, more preferably in the range of 0.1 to 1.5 g/10 min, (i.ii) ethylene content of at least 0.50 wt.-%, more preferably in the range of 0.50 to 5.00 wt.-%, more preferably in the range of 0.80 to 3.50 wt.-%, still more preferably in the range of 1.00 to 2.50 w.-%, (ii) a first propylene homopolymer fraction (H-PP-B) having a melt flow rate (MFR$_2$) measured according to ISO 1133 of at least 3.0 g/10 min, preferably in the range of 3.0 to 10.0 g/10 min, more preferably in the range of 4.0 to 8.0 g/10 min, and (iii) a second propylene homopolymer fraction (H-PP-C) has a melt flow rate (MFR$_2$) measured according to ISO 1133 of in the range of 1.5 to 6.0 g/10 min, preferably in the range of 2.0 to 5.0 g/10 min, more preferably in the range of 2.5 to 4.0 g/10 min.

Independently whether the ethylene-propylene copolymer (E-PP) is unimodal or multimodal, like trimodal, it comprises (a) 15 to 40 wt.-%, preferably 20 to 35 wt.-%, of the ethylene-propylene copolymer fraction (E-PP-A), preferably produced in the first reactor (R1), (b) 25 to 50 wt.-%, preferably 30 to 45 wt.-%, of the second polypropylene fraction (PP-B), preferably produced in the second reactor (R2), wherein said second polypropylene (PP-B) is preferably the first propylene homopolymer fraction (H-PP-B), and (c) 15 to 40 wt.-%, preferably 25 to 35 wt.-%, of the third polypropylene fraction (PP-C), preferably produced in the third reactor (R3), wherein said third polypropylene fraction (PP-C) is preferably the second propylene homopolymer fraction (H-PP-C), wherein the amount is based on the total weight of the ethylene-propylene copolymer (E-PP), preferably the amount is based on the total weight of the ethylene-propylene copolymer fraction (E-PP-A), the second polypropylene fraction (PP-B), preferably the first propylene homopolymer fraction (H-PP-B), and the third polypropylene fraction (PP-C), preferably the second propylene homopolymer fraction (H-PP-C), together.

Further preferred embodiments of the ethylene-propylene copolymer fraction (E-PP-A) are preferred embodiments of the polypropylene (PP) defined above.

Biaxially Oriented Film/Capacitor Film

The polypropylene (PP), especially the ethylene-propylene copolymer (E-PP), as defined can be subjected to a film forming process obtaining thereby a capacitor film. Preferably the polypropylene (PP), especially the ethylene-propylene copolymer (E-PP), is the only polymer within the capacitor film. Accordingly the capacitor film may contain additives but preferably no other polymer. Thus the remaining part up to 100.0 wt.-% may be accomplished by additives known in the art, like antioxidants. However this remaining part shall not be more than 5.0 wt.-%, preferably not more than 2.0 wt.-%, like not more than 1.0 wt. %, within the capacitor film. Accordingly the capacitor film preferably comprises more than 95.0 wt.-%, more preferably more 98.0 wt.-%, like more than 99.0 wt.-%, of the polypropylene (PP), especially the ethylene-propylene copolymer (E-PP), as defined herein. The thickness of the capacitor film can be up to 15.0 µm, however, typically the capacitor film has a thickness of not more than 12.0 µm, preferably not more than 10.0 µm, more preferably not more than 8.0 µm, yet more preferably in the range of 2.5 to 10 µm, like in the range of 3.0 to 8.0 µm.

Further it is preferred that the capacitor film is a biaxially oriented film, i.e. the polypropylene (PP), especially the ethylene-propylene copolymer (E-PP), as defined above or any mixtures (blends) comprising the polypropylene (PP), especially comprising the ethylene-propylene copolymer (E-PP), has/have been subjected to a drawing process obtaining thereby a biaxially oriented polymer. As indicated above capacitor film preferably contains the polypropylene (PP), especially the ethylene-propylene copolymer (E-PP), as only polymer and thus it is preferably a biaxially oriented polypropylene (BOPP) made from said polypropylene (PP), especially made from said ethylene-propylene copolymer (E-PP).

Preferably the capacitor film, i.e. the biaxially oriented polypropylene (BOPP), has a draw ratio in machine direction of at least 3.0 and a draw ratio in transverse direction of at least 3.0. Such ratios are appreciated as commercial biaxially oriented polypropylene films must be stretchable at least to the above defined extent without breaking. The length of the sample increases during stretching in longitudinal direction and the draw ratio in longitudinal direction calculates from the ratio of current length over original sample length. Subsequently, the sample is stretched in transverse direction where the width of the sample is increasing. Hence, the draw ratio calculates from the current width of the sample over the original width of the sample. Preferably the draw ratio in machine direction of the capacitor film, i.e. of the biaxially oriented polypropylene (BOPP), ranges from 3.5 to 8.0, more preferably from 4.5 to 6.5. The draw ratio in transverse direction of the capacitor film, i.e. of the biaxially polypropylene (BOPP), ranges preferably from 4.0 to 15.0, more preferably from 6.0 to 10.0. Temperature range during stretching is in general 100° C. to 180° C.

As the capacitor film, i.e. the biaxially oriented polypropylene (BOPP), preferably is produced from the polypropylene (PP), especially from the ethylene-propylene copolymer (E-PP), as defined above, the properties given for the polypropylene (PP), especially for the ethylene-propylene copolymer (E-PP), are equally applicable for the capacitor film if not specified differently.

Preferably the polypropylene (PP), especially the ethylene-propylene copolymer (E-PP), is biaxially oriented.

After the preparation of the polypropylene (PP), the polypropylene (PP) is subjected to a film forming process. Any film forming processes which are suitable for the manufacture of a capacitor film can be used.

In a preferred embodiment the polypropylene (PP) is not subjected to a washing step prior to the film forming process.

The capacitor film, i.e. the biaxially oriented polypropylene (BOPP), can be prepared by conventional drawing processes known in the art. Accordingly the process for the manufacture of a capacitor film, i.e. the biaxially oriented polypropylene (BOPP), according to this invention comprises the use of the polypropylene (PP) as defined herein and its forming into a film preferably by the tenter method known in the art.

The tenter method is in particular a method in which the polypropylene (PP), especially the ethylene-propylene copolymer (E-PP), as defined herein is melt extruded from a slit die such as a T-die and cooled on a cooling drum obtaining an undrawn sheet. Said sheet is pre-heated for example with a heated metal roll and then drawn in the length direction between a plurality of rolls over which a difference in peripheral speeds is established and then both edges are gripped with grippers and the sheet is drawn in the transverse direction in an oven by means of a tenter resulting in a biaxially drawn film. The temperature of said stretched sheet during the longitudinal drawing is preferably controlled in such a way as to be within the temperature range of the melting point of the polypropylene as defined herein (machine direction: −20 to −10° C.; transverse direction: −5 to +10° C.). The uniformity of the film thickness on transverse drawing can be evaluated with the method in which a fixed region on the film is masked after drawing in the length direction and measuring the actual drawing factor by measuring the spacing of the said masking after transverse drawing.

Subsequently, the capacitor film, i.e. the biaxially oriented film (BOPP), can be treated by corona discharge in air, nitrogen, carbon dioxide gas or any of the mixtures on the surface to be metalized, to improve the adhesive strength to the metal to be deposited, and wound by a winder.

In the following the present invention is further illustrated by means of examples.

EXAMPLES

A. Measuring Methods

The following definitions of terms and determination methods apply for the above general description of the invention including the claims as well as to the below examples unless otherwise defined.

Quantification of Microstructure by NMR Spectroscopy

Quantitative nuclear-magnetic resonance (NMR) spectroscopy was used to quantify the stereo-regularity (tacticity), regio-regularity and comonomer content of the polymers. Quantitative $^{13}$C {$^{1}$H} NMR spectra were recorded in the solution-state using a Bruker Advance III 400 NMR spectrometer operating at 400.15 and 100.62 MHz for $^{1}$H and $^{13}$C respectively. All spectra were recorded using a $^{13}$C optimised 10 mm extended temperature probehead at 125° C. using nitrogen gas for all pneumatics.

For polypropylene homopolymers approximately 200 mg of material was dissolved in 1,2-tetrachloroethane-d$_2$ (TCE-d$_2$). To ensure a homogenous solution, after initial sample preparation in a heat block, the NMR tube was further heated in a rotary oven for at least 1 hour. Upon insertion into the magnet the tube was spun at 10 Hz. This setup was chosen primarily for the high resolution needed for tacticity distribution quantification (Busico, V., Cipullo, R., Prog. Polym. Sci. 26 (2001) 443; Busico, V.; Cipullo, R., Monaco, G., Vacatello, M., Segre, A. L., Macromolecules 30 (1997) 6251). Standard single-pulse excitation was employed utilising the NOE and bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 11289). A total of 8192 (8 k) transients were acquired per spectrum.

For ethylene-propylene copolymers approximately 200 mg of material was dissolved in 3 ml of 1,2-tetrachloroethane-d$_2$ (TCE-d$_2$) along with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 11289). A total of 6144 (6 k) transients were acquired per spectra.

Quantitative $^{13}$C {$^{1}$H} NMR spectra were processed, integrated and relevant quantitative properties determined from the integrals using proprietary computer programs.

For ethylene-propylene copolymers all chemical shifts were indirectly referenced to the central methylene group of the ethylene block (EEE) at 30.00 ppm using the chemical shift of the solvent. This approach allowed comparable referencing even when this structural unit was not present.

For polypropylene homopolymers all chemical shifts are internally referenced to the methyl isotactic pentad (mmmm) at 21.85 ppm.

Characteristic signals corresponding to regio defects (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) or comonomer were observed.

The presence of 2,1 erythro regio defects was indicated by the presence of the two methyl sites at 17.7 and 17.2 ppm and confirmed by other characteristic sites.

Characteristic signals corresponding to other types of regio defects were not observed (Resconi, L., Cavallo, L., Fait, A., Piemontesi, F., Chem. Rev. 2000, 100, 1253).

The amount of 2,1 erythro regio defects was quantified using the average integral of the two characteristic methyl sites at 17.7 and 17.2 ppm:

$$P_{21e}=(I_{e6}+I_{e8})/2$$

The amount of 1.2 primary inserted propene was quantified based on the methyl region with correction undertaken for sites included in this region not related to primary insertion and for primary insertion sites excluded from this region:

$$P_{12}=I_{CH3}+P_{12e}$$

The total amount of propene was quantified as the sum of primary inserted propene and all other present regio defects:

$$P_{total}=P_{12}+P_{21e}$$

The mole percent of 2.1 erythro regio defects was quantified with respect to all propene:

$$[21e]\ mol\ \%=100*(P_{21e}/P_{total})$$

For copolymers characteristic signals corresponding to the incorporation of ethylene were observed (Cheng, H. N., Macromolecules 17 (1984), 1950).

With regio defects also observed (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) correction for the influence of such defects on the comonomer content was required.

The mole fraction of ethylene in the polymer was quantified using the method of Wang et. al. (Wang, W-J., Zhu, S., Macromolecules 33 (2000), 1157) through integration of multiple signals across the whole spectral region of a $^{13}$C{$^{1}$H} spectra acquired using defined conditions. This method was chosen for its accuracy, robust nature and ability to account for the presence of regio-defects when needed. Integral regions were slightly adjusted to increase applicability to a wider range of comonomer contents.

The mole percent comonomer incorporation in the polymer was calculated from the mole fraction according to:

$$E\ [mol\ \%]=100*fE$$

The weight percent comonomer incorporation in the polymer was calculated from the mole fraction according to:

$$E\ [wt\ \%]=100*(fE*28.05)/((fE*28.05)+((1-fE)*42.08))$$

The comonomer sequence distribution at the triad level was determined using the method of Kakugo et al. (Kakugo, M., Naito, Y., Mizunuma, K., Miyatake, T. Macromolecules 15 (1982) 1150) through integration of multiple signals across the whole spectral region of a $^{13}$C{$^{1}$H} spectra acquired using defined conditions. This method was chosen for its robust nature. Integral regions were slightly adjusted to increase applicability to a wider range of comonomer contents.

The mole percent of a given comonomer triad sequence in the polymer was calculated from the mole fraction determined by the method of Kakugo et at. (Kakugo, M., Naito, Y., Mizunuma, K., Miyatake, T. Macromolecules 15 (1982) 1150) according to:

$$XXX\ [mol\ \%]=100*fXXX$$

The mole fraction comonomer incorporation in the polymer, as determined from the comonomer sequence distribution at the triad level, were calculated from the triad distribution using known necessary relationships (Randall, J. Macromol. Sci., Rev. Macromol. Chem. Phys. 1989, C29, 201):

$$fXEX=fEEE+fPEE+fPEP$$

$$fXPX=fPPP+fEPP+fEPE$$

where PEE and EPP represents the sum of the reversible sequences PEE/EEP and EPP/PPE respectively.

The randomness of the comonomer distribution was quantified as the relative amount of isolated ethylene sequences as compared to all incorporated ethylene. The randomness was calculated from the triad sequence distribution using the relationship:

$$R(E)\ [\%]=100*(fPEP/fXEX)$$

Calculation of comonomer content of the second polypropylene fraction (PP-B):

$$\frac{C(R2) - w(PP1) \times C(PP1)}{w(PP2)} = C(PP2)$$

wherein w(PP1) is the weight fraction of the first polypropylene fraction (PP-A), i.e. the product of the first reactor (R1), w(PP2) is the weight fraction of the second polypropylene fraction (PP-B), i.e. of the polymer produced in the second reactor (R2), C(PP1) is the comonomer content [in wt.-%] of the first polypropylene fraction (PP-A), i.e. of the product of the first reactor (R1), C(R2) is the comonomer content [in wt.-%] of the product obtained in the second reactor (R2), i.e. the mixture of the first polypropylene fraction (PP-A) and the second polypropylene fraction (PP-B), C(PP2) is the calculated comonomer content [in wt.-%] of the second polypropylene (PP-B).

Calculation of comonomer content of the third polypropylene fraction (PP-C):

$$\frac{C(R3) - w(R2) \times C(R2)}{w(PP3)} = C(PP3)$$

wherein w(R2) is the weight fraction of the second reactor (R2), i.e. the mixture of the first polypropylene fraction (PP-A) and the second polypropylene fraction (PP-B), w(PP3) is the weight fraction of the third polypropylene fraction (PP3), i.e. of the polymer produced in the third reactor (R3), C(R2) is the comonomer content [in wt.-%] of the product of the second reactor (R2), i.e. of the mixture of the first polypropylene fraction (PP-A) and second polypropylene fraction (PP-B), C(R3) is the comonomer content [in wt.-%] of the product obtained in the third reactor (R3), i.e. the mixture of the first polypropylene fraction (PP-A), the second polypropylene fraction (PP-B), and the third polypropylene fraction (PP-C), C(PP3) is the calculated comonomer content [in wt.-%] of the third polypropylene fraction (PP-C).

Rheology: Dynamic rheological measurements were carried out with Rheometrics RDA-II QC on compression moulded samples under nitrogen atmosphere at 200° C. using 25 mm-diameter plate and plate geometry. The oscillatory shear experiments were done within the linear viscoelastic range of strain at frequencies from 0.01 to 500 rad/s. (ISO 6721-10) The values of storage modulus (G'), loss modulus (G''), complex modulus (G*) and complex viscosity ($\eta^*$) were obtained as a function of frequency ($\omega$).

The Zero shear viscosity ($\eta_0$) was calculated using complex fluidity defined as the reciprocal of complex viscosity. Its real and imaginary part are thus defined by $$f'(\omega)=\eta'(\omega)/[\eta'(\omega)^2+\eta''(\omega)^2] \text{ and}$$

$$f''(\omega)=\eta''(\omega)/[\eta'(\omega)^2+\eta''(\omega)^2]$$

From the following equations $$\eta'=G''/\omega \text{ and } \eta''=G'/\omega$$

$$f'(\omega)=G''(\omega)*\omega/[G'(\omega)^2+G''(\omega)^2]$$

$$f''(\omega)=G'(\omega)\cdot\omega/[G'(\omega)^2+G''(\omega)^2]$$

The Polydispersity Index, PI, $PI=10^5/G_c$, is calculated from the cross-over point of G'($\omega$) and G''($\omega$), for which G'($\omega_c$)=G''($\omega_c$)=$G_c$ holds.

Shear thinning indexes (SHI), which are correlating with MWD and are independent of MW, were calculated according to Heino [1,2] (below). The SHI (0/100) is defined as the ratio between the zero shear viscosity and the viscosity at the shear stress of a shear stress of 100 kPa ($\eta^*100$).

1) Rheological characterization of polyethylene fractions. Heino, E. L.; Lehtinen, A; Tanner, J.; Seppälä, J. Neste Oy, Porvoo, Finland. Theor. Appl. Rheol., Proc. Int. Congr. Rheol., 11th (1992), 1 360-362

2) The influence of molecular structure on some rheological properties of polyethylene. Heino, Eeva-Leena. Borealis Polymers Oy, Porvoo, Finland. Annual Transactions of the Nordic Rheology Society, 1995

Crossover Frequency $\omega_c$

The crossover frequency $\omega_c$ is determined from the crossover point of G'($\omega$) and G''($\omega$), for which G'($\omega_c$)=G''($\omega_c$)=$G_c$ holds.

Melt Flow Rate (MFR$_2$)

The melt flow rates were measured with a load of 2.16 kg (MFR$_2$) at 230° C. The melt flow rate is that quantity of polymer in grams which the test apparatus standardized to ISO 1133 extrudes within 10 minutes at a temperature of 230° C. under a load of 2.16 kg.

Calculation of melt flow rate MFR$_2$ (230° C.) of the second polypropylene fraction (PP-B):

$$MFR(PP2) = 10^{\left[\frac{\log(MFR(R2))-w(PP1)\times\log(MFR(PP1))}{w(PP2)}\right]}$$

wherein w(PP1) is the weight fraction of the first polypropylene fraction (PP-A), i.e. the product of the first reactor (R1), w(PP2) is the weight fraction of the second polypropylene fraction (PP-B), i.e. of the polymer produced in the second reactor (R2), MFR(PP1) is the melt flow rate MFR$_2$ (230° C.) [in g/10 min] of the first polypropylene fraction (PP-A), i.e. of the product of the first reactor (R1), MFR(R2) is the melt flow rate MFR$_2$ (230° C.) [in g/10 min] of the product obtained in the second reactor (R2), i.e. the mixture of the first polypropylene fraction (PP-A) and the second polypropylene fraction (PP-B), MFR(PP2) is the calculated melt flow rate MFR$_2$ (230° C.) [in g/10 min] of the second polypropylene fraction (PP-B).

Calculation of melt flow rate MFR$_2$ (230° C.) of the third polypropylene fraction (PP-C):

$$MFR(PP3) = 10^{\left[\frac{\log(MFR(R3))-w(R2)\times\log(MFR(R2))}{w(PP3)}\right]}$$

wherein w(R2) is the weight fraction of the second reactor (R2), i.e. the mixture of the first polypropylene fraction (PP-A) and the second polypropylene fraction (PP-B), w(PP3) is the weight fraction of the third polypropylene fraction (PP-C), i.e. of the polymer produced in the third reactor (R3), MFR(R2) is the melt flow rate MFR$_2$ (230° C.) [in g/10 min] of the product of the second reactor (R2), i.e. of the mixture of the first polypropylene fraction (PP-A) and second polypropylene fraction (PP-B), MFR(R3) is the melt flow rate MFR$_2$ (230° C.) [in g/10 min] of the product obtained in the third reactor (R3), i.e. the mixture of the first polypropylene fraction (PP-A), the second polypropylene fraction (PP-B), and the third polypropylene fraction (PP-C), MFR(PP3) is the calculated melt flow rate MFR$_2$ (230° C.) [in g/10 min] of the third polypropylene fraction (PP-C).

Number average molecular weight ($M_n$), weight average molecular weight ($M_w$) and molecular weight distribution (MWD) are determined by Gel Permeation Chromatography (GPC) according to the following method:

The weight average molecular weight Mw and the molecular weight distribution (MWD=Mw/Mn wherein Mn is the number average molecular weight and Mw is the weight average molecular weight) is measured by a method based on ISO 16014-1:2003 and ISO 16014-4:2003. A Waters Alliance GPCV 2000 instrument, equipped with refractive index detector and online viscosimeter was used with 3× TSK-gel columns (GMHXL-HT) from TosoHaas and 1,2,4-trichlorobenzene (TCB, stabilized with 200 mg/L 2,6-Di tert butyl-4-methyl-phenol) as solvent at 145° C. and at a constant flow rate of 1 mL/min. 216.5 μL of sample solution were injected per analysis. The column set was calibrated using relative calibration with 19 narrow MWD polystyrene (PS) standards in the range of 0.5 kg/mol to 11 500 kg/mol and a set of well characterized broad polypropylene standards. All samples were prepared by dissolving 5-10 mg of polymer in 10 mL (at 160° C.) of stabilized TCB (same as mobile phase) and keeping for 3 hours with continuous shaking prior sampling in into the GPC instrument.

The ash content is measured according to ISO 3451-1 (1997).

ICP (Inductively Coupled Plasma) Analysis

Inductively coupled plasma emission spectrometry (ICP) is an analytical technique used for the detection of trace metals. It is a type of emission spectroscopy that uses the inductively coupled plasma (argon) to produce excited atoms and ions that emit electromagnetic radiation at wavelengths characteristic of a particular element. The intensity of this emission is indicative of the concentration of the element within the sample.

Apparatus used: Optima 2000DV from Perkin-Elmer

Titanium, aluminium and magnesium in pellets are determined with ICP. Acid standards are used as reference.

Sample Preparation

Samples (sample weight [g]) are first ashed following DIN EN ISO 3451-1 and the ash is dissolved in H$_2$SO$_4$ 1N (sample conc. [mg/l])

Standards:

Standard Titanium solution (Merck): 1000 ppm Ti=stock solution A

Standard Aluminium solution (Merck): 1000 ppm Al=stock solution B

Standard Magnesium solution (Merck): 1000 ppm Mg=stock solution C

Standard 10 ppm Ti, Al, Mg 1 ml of the respective stock solution is diluted in a volumetric flask up to 100 ml with distilled water Acid standard 10 ppm Ti, 10 ppm Al and 10 ppm Mg 1 ml stock solutions A, B and C are put in a 100 ml volumetric flask. 2 g KHSO$_4$ and 25 ml H$_2$SO$_4$ 1N are added and diluted up to 100 ml with distilled water=standard high concentration Acid standard 1 ppm Ti, 1 ppm Al and 1 ppm Mg 10 ml of each standard 10 ppm Ti, AL, Mg are put in a 100 ml volumetric flask. 2 g KHSO$_4$ and 25 ml H$_2$SO$_4$ 1N are added and dilute up to 100 ml with distilled water=standard low concentration Blank sample for determination of Al, Ti and Mg 25 ml H$_2$SO$_4$ and 2 g KHSO$_4$ are put in a 100 ml volumetric flask and diluted up to 100 ml with distilled water=standard blank Al, Ti, Mg The obtained results of the standard low concentration and standard high concentration are inspected in the calibration summary. The "RSD value" (relative standard deviation value) of the standard should always be ≤10%. The obtained results must be close to the real value of the standards used. The calibration summary is checked. The correlation coefficient must be ≥0.997.

The samples are analysed 3 times each. The obtained results are checked and ensured that the RSD ≤10%.

The average value of 3 determinations is reported.

Calculate the concentration of the element (ppm) as:

$$\frac{Sample\ conc\ (mg/l) \times 100}{Sample\ weight\ used\ for\ calcinations\ (g)}$$

The xylene solubles (XCS, wt.-%): Content of xylene cold solubles (XCS) is determined at 25° C. according ISO 16152; first edition; 2005 Jul. 1.

Melting temperature $T_m$, crystallization temperature $T_c$, is measured with Mettler TA820 differential scanning calorimetry (DSC) on 5-10 mg samples. Both crystallization and melting curves were obtained during 10° C./min cooling and heating scans between 30° C. and 225° C. Melting and crystallization temperatures were taken as the peaks of endotherms and exotherms.

Also the melt- and crystallization enthalpy (Hm and Hc) were measured by the DSC method according to ISO 11357-3.

Stepwise Isothermal Segregation Technique (SIST)

The isothermal crystallisation for SIST analysis was performed in a Mettler TA820 DSC on 3±0.5 mg samples at decreasing temperatures between 200° C. and 105° C.

(i) the samples were melted at 225° C. for 5 min.,
(ii) then cooled with 80° C./min to 145° C.
(iii) held for 2 hours at 145° C.,
(iv) then cooled with 80° C./min to 135° C.
(v) held for 2 hours at 135° C., (vi) then cooled with 80° C./min to 125° C.
(vii) held for 2 hours at 125° C.,
(viii) then cooled with 80° C./min to 115° C.
(ix) held for 2 hours at 115° C.,
(x) then cooled with 80° C./min to 105° C.
(xi) held for 2 hours at 105° C.

After the last step the sample was cooled down with 80° C./min to −10° C. and the melting curve was obtained by heating the cooled sample at a heating rate of 10° C./min up to 200° C. All measurements were performed in a nitrogen atmosphere. The melt enthalpy is recorded as function of temperature and evaluated through measuring the melt enthalpy of fractions melting within temperature intervals of 50 to 60° C.; 60 to 70° C.; 70 to 80° C.; 80 to 90° C.; 90 to 100° C.; 100 to 110° C.; 110 to 120° C.; 120 to 130° C.; 130 to 140° C.; 140 to 150° C.; 150 to 160° C.; 160 to 170° C.; 170 to 180° C.; 180 to 190° C.; 190 to 200° C.

temperature of the slurry was increased slowly to 20° C. At this temperature, 0.02 mol of dioctylphthalate (DOP) was added to the slurry. After the addition of the phthalate, the temperature was raised to 135° C. during 90 minutes and the slurry was allowed to stand for 60 minutes. Then, another 300 ml of $TiCl_4$ was added and the temperature was kept at 135° C. for 120 minutes. After this, the catalyst was filtered from the liquid and washed six times with 300 ml heptane at 80° C. Then, the solid catalyst component was filtered and dried. Catalyst and its preparation concept is described in general e.g. in patent publications EP491566, EP591224 and EP586390. As co-catalyst triethyl-aluminium (TEAL) and as donor dicyclo pentyl dimethoxy silane (D-donor) was used. The aluminium to donor ratio is indicated in table 1.

TABLE 1

Preparation of polypropylene (PP) examples

|  |  | CE1 Trimodal | IE1 Trimodal | IE2 Trimodal | CE2 Monomodal | IE3 Monomodal |
|---|---|---|---|---|---|---|
| Pre-polymerization |  |  |  |  |  |  |
| Ti in cat | [wt.-%] | 1.80 | 1.80 | 1.80 | 1.80 | 1.80 |
| TEAL/Ti | [mol/mol] | 155 | 155 | 155 | 155 | 155 |
| TEAL/Donor | [mol/mol] | 16.0 | 17.0 | 16.0 | 17.0 | 17.0 |
| cat feed rate | [g/h] | 1.00 | 1.00 | 1.00 | 0.70 | 0.55 |
| C2/C3 ratio | [mol/kmol] | 0.00 | 1.25 | 1.26 | 0.00 | 1.31 |
| C2/C3 feed rate | [g/kg] | 0.00 | 4.00 | 3.99 | 0.00 | 4.32 |
| C2 feed rate | [kg/h] | 0.0 | 0.3 | 0.3 | 0.0 | 0.3 |
| Pre-PP/TM | [kg/g][ | 1.10 | 2.30 | 2.40 | 0.9 | 1.6 |
| split | [wt.-%] | 1.5 | 2.5 | 2.4 | 1.8 | 2.5 |
| LOOP |  |  |  |  |  |  |
| split | [wt.-%] | 30.3 | 33.5 | 32.8 | 21.7 | 20.3 |
| $MFR_2$ | [g/10'] | 1.2 | 1.0 | 0.9 | 2.9 | 2.9 |
| XCS | [wt %] | 2.6 | 3.8 | 3.4 | 3.0 | 3.6 |
| C2 content | [wt-%] | 0.0 | 1.4 | 1.4 | 0.0 | 1.7 |
| C2/C3 ratio | [mol/kmol] | 0.00 | 0.29 | 0.28 | 0.00 | 0.35 |
| H2/C3 | [mol/kmol] | 0.65 | 0.68 | 0.67 | 1.74 | 1.76 |
| GPR1 |  |  |  |  |  |  |
| Split | [wt.-%] | 38.6 | 37.7 | 35.5 | 46.0 | 43.0 |
| $MRF_2$ | [g/10'] | 3.1 | 2.3 | 2.6 | 3.0 | 3.0 |
| $MFR_2$ (in GPR1) | [g/10'] | 6.5 | 4.8 | 6.9 | 3.0 | 3.0 |
| XCS | [wt %] | 2.5 | 2.3 | 2.7 | 1.9 | 2.4 |
| C2/C3 ratio | [mol/kmol] | 0.00 | 0.00 | 0.00 | 0.00 | 0.00 |
| H2/C3 | [mol/kmol] | 52 | 46 | 49 | 18 | 18 |
| GPR2 |  |  |  |  |  |  |
| split | [wt %] | 29.6 | 26.3 | 29.3 | 30.5 | 34.2 |
| $MFR_2$ | [g/10'] | 2.9 | 2.4 | 2.8 | 3.4 | 3.3 |
| $MFR_2$ (in GPR2) | [g/10'] | 2.5 | 2.7 | 3.3 | 4.5 | 3.9 |
| XCS | [wt %] | 2.3 | 1.8 | 2.4 | 1.8 | 2.3 |
| H2/C3 | [mol/kmol] | 16 | 18 | 20 | 17 | 17 |
| C2/C3 ratio | [mol/kmol] | 0.00 | 0.00 | 0.00 | 0.00 | 0.00 |
| Productivity | [kg/g] | 65 | 102 | 93 | 123 | 168 |
| TEAL/C3 | [g/t] | 36.7 | 36.5 | 36.5 | 25.3 | 32.6 |
| Donor/C3 | [g/t] | 4.4 | 4.4 | 4.4 | 3.1 | 3.9 |

B. Examples

The catalyst used in the polymerization process for examples IE1, IE2, IE3, CE1 and CE2 has been produced as follows: First, 0.1 mol of $MgCl_2 \times 3$ EtOH was suspended under inert conditions in 250 ml of decane in a reactor at atmospheric pressure. The solution was cooled to the temperature of −15° C. and 300 ml of cold $TiCl_4$ was added while maintaining the temperature at said level. Then, the

TABLE 2

Properties of the polypropylene (PP) examples

|  |  | CE1 | IE1 | IE2 | CE2 | IE3 |
|---|---|---|---|---|---|---|
| MFR | [g/10 min] | 2.9 | 2.4 | 2.8 | 3.4 | 3.3 |
| XCS | [wt.-%] | 2.3 | 1.8 | 2.4 | 1.8 | 2.3 |
| $T_m$ | [° C.] | 166 | 166 | 167 | 165 | 165 |
| $T_c$ | [° C.] | 119 | 116 | 114 | 114 | 112 |
| Ash | [ppm] | 58 | 38 | 42 | 34 | 25 |

TABLE 2-continued

Properties of the polypropylene (PP) examples

|   |   | CE1 | IE1 | IE2 | CE2 | IE3 |
|---|---|---|---|---|---|---|
| Al | [ppm] | 14.7 | 15.7 | 10.6 | 10.7 | 9.8 |
| Mg | [ppm] | 6 | 4.1 | 4.5 | 3.3 | 2.8 |
| Microstructure by NMR | | | | | | |
| 2,1 e | [mol-%] | n.d. | n.d. | n.d. | n.d. | n.d. |
| C2 content | [wt.-%] | 0.0 | 0.4 | 0.5 | 0.0 | 0.4 |
| Melt Rheology, Frequency sweep, 200° C. | | | | | | |
| $w_c$ | [rad/s] | 18.5 | 16.0 | 17.8 | 20.2 | 19.5 |
| PI | [Pa$^{-1}$] | 3.7 | 3.8 | 3.8 | 3.7 | 3.7 |
| SHI0/100 | [—] | 28 | 31 | 31 | 25 | 25 |
| Microstructure by SIST | | | | | | |
| 160-170° C. | [wt.-%] | 35.09 | 41.55 | 41.55 | 34.92 | 40.50 |
| 170-180° C. | [wt.-%] | 32.29 | 17.51 | 17.51 | 31.46 | 20.38 |
| Molecular Weight | | | | | | |
| $M_n$ | [kg/mol] | 37 | 35 | 36 | 50 | 52 |
| $M_w$ | [kg/mol] | 275 | 280 | 280 | 270 | 270 |
| MWD | [—] | 7.4 | 8.0 | 7.8 | 5.4 | 5.2 | n.d = not detectable

As can be seen from the above examples and comparative examples, monomodal and multimodal polypropylene polymers can be manufactured according to the present invention with increased productivity. Regarding the multimodal polypropylene polymers, inventive examples IE1 and IE2 are to be compared to comparative example CE1. IE1, IE2 and CE1 all relate to trimodal polypropylene polymers having comparable properties as evident from table 2. However, in IE1 and IE2 the productivity per catalyst used has been significantly increased, i.e. starting from CE1, the productivity in IE1 is higher by 57% and the productivity in IE2 is higher by 43%. Accordingly, the amount of impurities, e.g. the ash content is significantly lower in IE1 and IE2.

Concerning monomodal polypropylene polymers, IE3 has to be compared to CE2. As in case of multimodal polypropylene polymers, the productivity per catalyst used has been improved significantly, i.e. by 37%. The properties of the resulting monomodal polypropylene polymers are, however, comparable. On the other hand, the amount of impurities is significantly lower in IE3 compared to CE2.

It has been shown that by using an ethylene feed during pre-polymerization a wide range of polypropylene polymers can be obtained with increasing productivity and, thus, reduced impurity content even in the absence of a washing step.

We claim:

1. A process for the preparation of a polypropylene (PP) in a sequential polymerization process comprising a pre-polymerization reactor (PR) and at least two polymerization reactors (R1 and R2) connected in series, wherein
the polymerization in the at least two polymerization reactors (R1 and R2) takes place in the presence of a Ziegler-Natta catalyst (ZN-C), and said Ziegler-Natta catalyst (ZN-C) comprises
(a) a pro-catalyst (PC) comprising
(a1) a compound of a transition metal (TM),
(a2) a compound of a metal (M) which metal is selected from one of the groups 1 to 3 of the periodic table (IUPAC),
(a3) an internal electron donor (ID),
(b) a co-catalyst (Co), and
(c) an external donor (ED),
wherein the mol-ratio of co-catalyst (Co) to external donor (ED) [Co/ED] is in the range of above 10 to below 25, and
said Ziegler-Natta catalyst (ZN-C) is present in the pre-polymerization reactor (PR) and ethylene (C2) in addition to propylene (C3) is fed to said pre-polymerization reactor (PR)
(i) in a C2/C3 feed ratio of 0.5 to 10.0 g/kg; and/or
(ii) in a manner to accomplish a C2/C3 ratio in the pre-polymerization reactor (PR) of 0.5 to 5.0 mol/kmol.

2. The process according to claim 1, wherein ethylene is fed to the pre-polymerization reactor (PR) in addition to propylene
(a) in a C2/C3 feed ratio of 1.0 to 8.0 g/kg, and/or
(b) in a manner to accomplish a C2/C3 ratio in the pre-polymerization reactor (PR) of 0.8 to 3.0 mol/kmol.

3. The process according to claim 1, wherein further the mol-ratio of co-catalyst (Co) to transition metal (TM) [Co/TM] is in the range of above 100 to below 200.

4. The process according to claim 1, wherein further
(a) the mol-ratio of co-catalyst (Co) to external donor (ED) [Co/ED] is in the range of above 12 to below 23, and/or
(b) the mol-ratio of co-catalyst (Co) to transition metal (TM) [Co/TM] is in the range of above 110 to below 195.

5. The process according to claim 1, wherein the sequential polymerization process comprises at least three polymerization reactors (R1, R2 and R3) connected in series.

6. The process according to claim 1, wherein
(a) the temperature is at least in one of the at least two polymerization reactors (R1 and R2) in the range of 50° C. to 130° C.,
and/or
(b) the temperature in the pre-polymerization reactor (PR) is 0 to 60° C.

7. The process according to claim 1, wherein
(a) the weight-ratio of co-catalyst (Co) to propylene (C3) [Co/C3] is in the range of 25 g/t to 40 g/t, and/or
(b) the weight-ratio of external donor (ED) to propylene (C3) [ED/C3] is in the range of 2.8 g/t to 4.8 g/t.

8. The process according to claim 1, wherein
(a) the metal of the compound of a transition metal (TM) is selected from one of the groups 4 to 6 of the periodic table (IUPAC),
and/or
(b) the compound of a metal (M) is $MgCl_2$,
and/or
(c) the internal donor (ID) comprises an dialkylphthalate of formula (II)

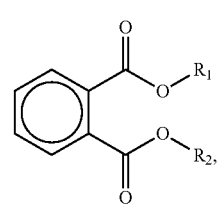

(II)

wherein $R_1$ and $R_2$ are independently a $C_1$ to $C_4$ alkyl.

9. The process according to claim 1, wherein
(a) the co-catalyst (Co) is an aluminium compound,
and/or
(b) the external donor (ED) is a hydrocarbyloxy silane.

10. The process according to claim 1, wherein
(a) the pre-polymerization reactor (PR) is a bulk slurry reactor;
and/or
(b) the first reactor (R1) is a loop reactor (LR) and/or optionally subsequent reactor(s) are gas phase reactors (GRs).

11. The process according to claim 1, wherein the process does not comprise a washing step for the polypropylene (PP).

12. The process according to claim 1, wherein
(a) in the pre-polymerization reactor (PR) propylene is reacted in the presence of ethylene and the Ziegler-Natta catalyst (ZN-C) comprising the pro-catalyst (PC), the external donor (ED) and the co-catalyst (Co), obtaining thereby a mixture (MI) of the produced polypropylene (Pre-PP) and the used Ziegler-Natta catalyst (ZN-C),
(b) transferring said mixture (MI) comprising the Ziegler-Natta catalyst (ZN-C) and the polypropylene (Pre-PP) and un-reacted ethylene in the first polymerization reactor (R1),
(c) in the first polymerization reactor (R1) propylene, ethylene and optionally at least one other α-olefin, like optionally a $C_4$ to $C_{10}$ α-olefin, are polymerized in the presence of the Ziegler-Natta catalyst (ZN-C) obtaining a first polypropylene fraction (PP-A) of the polypropylene (PP),
(d) transferring said first polypropylene fraction (PP-A) to the second polymerization reactor (R2),
(e) in the second polymerization reactor (R2) propylene and optionally at least one other α-olefin, like optionally a $C_2$ to $C_{10}$ α-olefin other than propylene, is/are polymerized in the presence of the first polypropylene fraction (PP-A) obtaining a second polypropylene fraction (PP-B) of the polypropylene (PP), said first polypropylene fraction (PP-A) and said second polypropylene fraction (PP-B) form a first mixture ($1^{st}$ M),
(f) transferring said first mixture ($1^{st}$ M) to a third polymerization reactor (R3), and
(g) in the third polymerization reactor (R3) propylene and optionally at least one other α-olefin, like optionally a $C_2$ to $C_{10}$ α-olefin other than propylene, is/are polymerized in the presence of the first mixture ($1^{st}$ M) obtaining a third polypropylene fraction (PP-C) of the polypropylene (PP), said first mixture ($1^{st}$ M) and said third polypropylene fraction (PP-C) form the polypropylene (PP).

13. The process according to claim 1, wherein the polypropylene (PP) has
(a) a melt flow rate ($MFR_2$) measured according to ISO 1133 in the range of 0.5 to 7.0 g/10 min;
and/or
(b) an ash content below 45 ppm;
and/or
(c) a shear thinning index (0/100) measured according to ISO 6271-10 (200° C.) of at least 20;
and/or
(d) a polydispersity index (PI) of at least 2.5.

14. The process according to claim 1, wherein the polypropylene (PP) has
(a) a melting temperature Tm of more than 163° C.;
and/or
(b) a crystallization temperature Tc of more than 110° C.

15. The process according to claim 1, wherein the polypropylene (PP) is an ethylene-propylene copolymer (E-PP).

16. The process according to claim 1, wherein the polypropylene (PP) is
(a) a monomodal polypropylene (PP),
or
(b) is a multimodal polypropylene (PP), wherein each polypropylene fraction present has a different melt flow rate $MFR_2$.

17. An ethylene-propylene copolymer (E-PP) having
(a) a melt flow rate ($MFR_2$) measured according to ISO 1133 in the range of 0.5 to 7.0 g/10 min,
(b) a melting temperature Tm of more than 163° C.,
(c) an ethylene content of more than 0.05 wt.-% to 0.80 wt.-% based on the total weight of the ethylene-propylene copolymer (E-PP),
(d) optionally a crystalline fraction melting above 170 to 180° C. of at least 14.0 wt.-%, wherein said fraction is determined by the stepwise isothermal segregation technique (SIST), and
(e) an ash content below 45 ppm.

18. The ethylene-propylene copolymer (E-PP) according to claim 17, wherein said ethylene-propylene copolymer (E-PP) has further
(a) a crystallization temperature Tc of more than 110° C.,
and/or
(b) 2,1 erythro regio-defects of equal or below 0.4 mol determined by $^{13}$C-NMR spectroscopy,
and/or
(c) a crystalline fraction melting above 160 to 170° C. of more than 36.0 wt.-%, wherein said fraction is determined by the stepwise isothermal segregation technique (SIST),
and/or
(d) a shear thinning index (0/100) measured according to ISO 6271-10 (200° C.) of at least 20,
and/or
(e) a polydispersity index (PI) of at least 2.5.

19. The ethylene-propylene copolymer (E-PP) according to claim 17, wherein said ethylene-propylene copolymer (E-PP) comprises
(a) 15 to 40 wt.-% of an ethylene-propylene copolymer fraction (E-PP-A),
(b) 25 to 50 wt.-% of a second polypropylene fraction (PP-B), and
(c) 15 to 40 wt.-% of a third polypropylene fraction (PP-C),
wherein the amount is based on the total weight of the ethylene-propylene copolymer (E-PP).

20. The ethylene-propylene copolymer (E-PP) according to claim 17, wherein said ethylene-propylene copolymer (E-PP) comprises an ethylene-propylene copolymer fraction (E-PP-A), a first propylene homopolymer fraction (H-PP-B) and a second propylene homopolymer fraction (H-PP-C), wherein said ethylene-propylene copolymer fraction (E-PP-A) has an ethylene content of at least 0.50 wt.-%.

21. The ethylene-propylene copolymer (E-PP) according to claim 17, wherein said ethylene-propylene copolymer (E-PP) is
(a) a monomodal ethylene-propylene copolymer (E-PP),
or
(b) is a multimodal ethylene-propylene copolymer (E-PP), wherein each polypropylene fraction present has a different melt flow rate $MFR_2$, which differ by more than +/−1.3 g/10 min.

* * * * *